(12) United States Patent
Brandt et al.

(10) Patent No.: US 12,124,774 B1
(45) Date of Patent: *Oct. 22, 2024

(54) METHOD AND SYSTEM FOR GENERATING CONSTRUCTION FRAMING SOLUTIONS

(71) Applicant: Boise Cascade Company, Boise, ID (US)

(72) Inventors: Chris Brandt, Boise, ID (US); Jacques Belzile, Quebec (CA)

(73) Assignee: Boise Cascade Company, Boise, ID (US)

( * ) Notice: Subject to any disclaimer, the term of this patent is extended or adjusted under 35 U.S.C. 154(b) by 726 days.

This patent is subject to a terminal disclaimer.

(21) Appl. No.: 17/189,817

(22) Filed: Mar. 2, 2021

Related U.S. Application Data

(60) Provisional application No. 62/990,236, filed on Mar. 16, 2020.

(51) Int. Cl.
*G06F 30/13* (2020.01)
*G06F 111/04* (2020.01)

(52) U.S. Cl.
CPC .......... *G06F 30/13* (2020.01); *G06F 2111/04* (2020.01)

(58) Field of Classification Search
CPC .............................. G06F 30/13; G06F 2111/04
USPC .......................................................... 703/1
See application file for complete search history.

(56) References Cited

U.S. PATENT DOCUMENTS

| | | | |
|---|---|---|---|
| 9,471,720 B1* | 10/2016 | Aalami | G06T 19/00 |
| 2006/0075718 A1* | 4/2006 | Borne | G06F 30/13 |
| | | | 52/745.02 |
| 2019/0102486 A1* | 4/2019 | Desai | G06Q 50/06 |
| 2021/0073449 A1* | 3/2021 | Segev | G06F 30/27 |
| 2021/0141957 A1* | 5/2021 | Jalla | G06F 30/13 |
| 2021/0141958 A1* | 5/2021 | Jalla | G06Q 10/06315 |

* cited by examiner

*Primary Examiner* — John E Johansen
*Assistant Examiner* — Adam Carrero
(74) *Attorney, Agent, or Firm* — Hawley Troxell Ennis & Hawley LLP; Philip McKay; Rivkah Young

(57) ABSTRACT

A method and system for generating a set of framing plan solutions for a building construction project uses a combination of code-based, physical, and performance attribute constraints, parameters, and variables and a ranking system that together provide framing plan alternatives selected from a calculated set of all possible framing plans. The framing plan alternatives are selected in a logical manner that considers constraints that are required as well as user selected and weighted constraints. The set of framing plan alternatives are then ranked according to input from the designer and/or customer regarding the relative importance of each of the constraints, parameters, and variables of the building construction project.

19 Claims, 28 Drawing Sheets
(23 of 28 Drawing Sheet(s) Filed in Color)

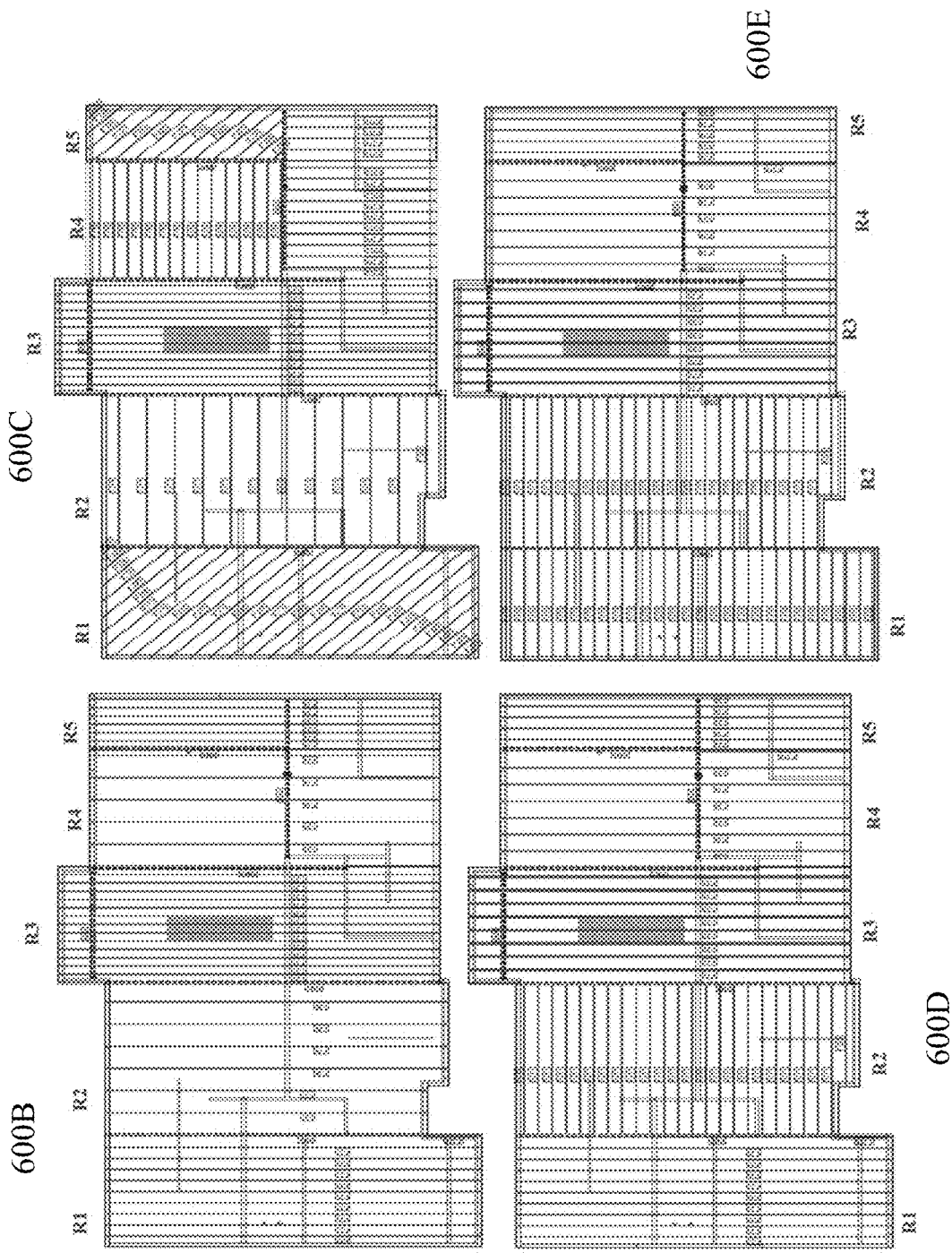

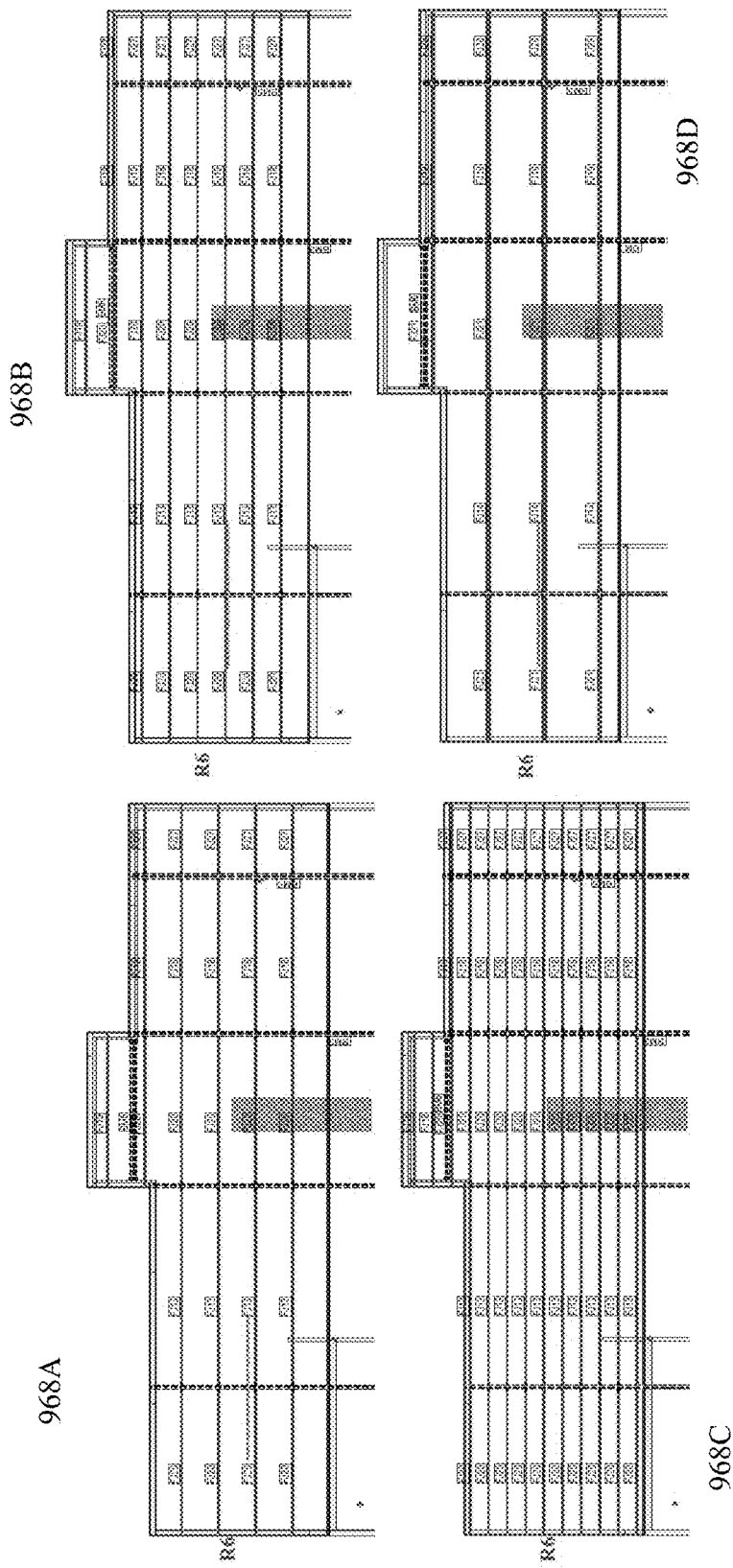

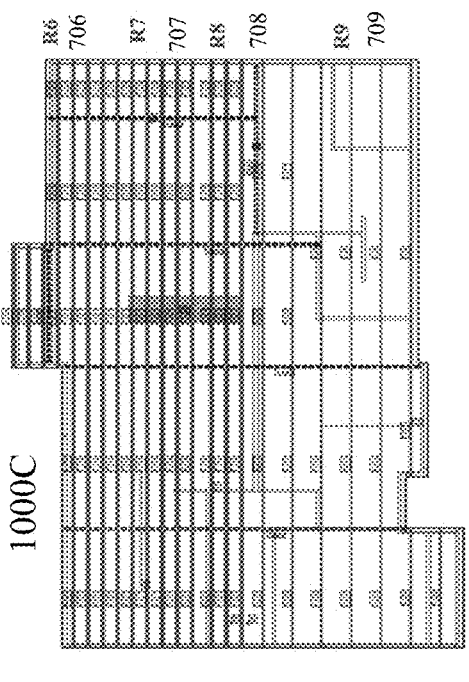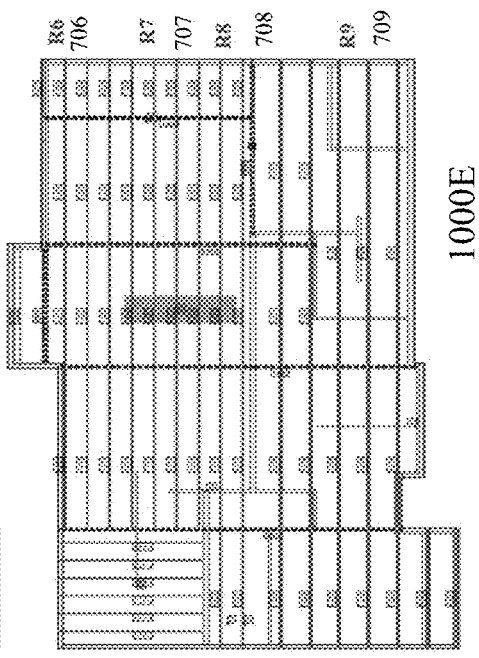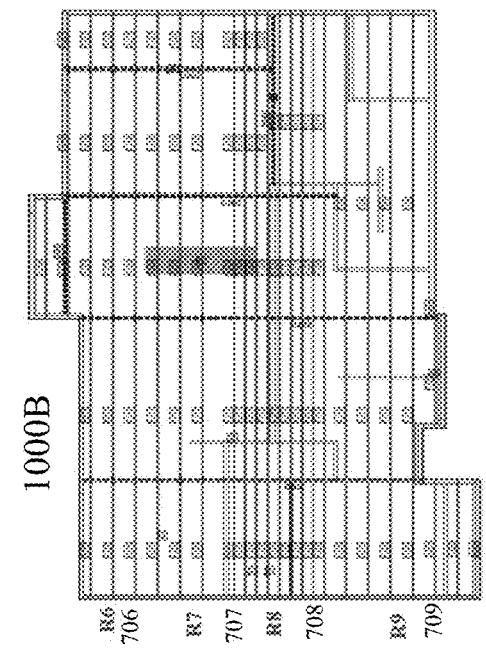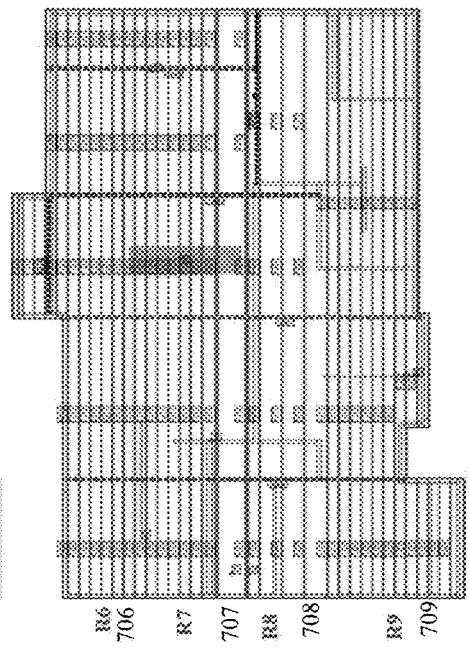
FIG. 10B

METHOD AND SYSTEM FOR GENERATING CONSTRUCTION FRAMING SOLUTIONS

RELATED APPLICATION

This application claims the benefit of Brandt, et. al, U.S. Provisional Application No. 62/990,236, filed on Mar. 16, 2020, titled "METHOD AND SYSTEM FOR GENERATING CONSTRUCTION FRAMING SOLUTIONS," which is hereby incorporated by reference in its entirety as if it were fully set forth herein.

BACKGROUND

In the construction industry one of the most consistently challenging tasks is determining the "best" framing layout for a structure to be constructed. Framing is required for virtually every wall and floor included in structures such as, but not limited to, homes, office buildings, retail stores, or any other structure or structure portion. Framing generally consists of positioning construction members, such as various sizes of lumber or metal, at regular intervals to provide structural integrity for the resulting structure. Some examples of construction members can include various lengths of 2×4, 4×4, or other dimensioned components. Typically, the size and interval spacing of the construction members is, at a minimum, dictated by local codes and ordinances and the laws of physics. However, in addition, other parameters can be used to determine the type and positioning of construction members that are not dictated by codes. These parameters can include, but are not limited to, a desired level of stiffness or strength of the resulting structure, anticipation of various loads that will be carried by the resulting structures or portions of structures, and numerous customer or designer variable parameters often dictated by the particular needs of the customer or designer.

The complexity of framing arises in large part from the fact that rarely is a global, or overall, structural framing plan, such as a global framing plan for an entire floor space or entire set of walls, uniform in either dimensions, or required loading, or desired or necessary materials. In addition, beyond simply meeting the desires and needs of the designer or customer and the various code requirements, there is also a need to create framing solutions that are economically viable, require minimal customized components, and are readily assembled on site in the field in an efficient and effective manner.

As an example, just a few of the constraints and parameters that must be taken into consideration when framing a construction project include, but are not limited to: the amount or volume of wood that is required for a particular framing plan; the number and type of joists, such as an I-joist, required for a particular framing plan; the On Center Spacing (OCS) for the various parts of a particular framing plan which will vary according to code requirements and the various load anticipated for various parts of the framing plan; starting offset for the particular framing plan; any beams that are required for a particular framing plan including the beam grade, width and beam depth; the number of hangers, welds, or other connectors, that are required for a particular framing plan; the number of skewed cuts that are required for particular framing plan; the deck layout of a particular framing plan; the availability of components needed for particular framing plan; and/or numerous other standard and/or customized requirements associated with any framing plan.

While the situation described above is certainly complicated enough, any framing plan is far from static and must be adjusted numerous times throughout the design process. However, the situation is extremely dynamic in that any change made in one portion of the framing plan for a wall or floor typically has a ripple effect throughout the entire building plan. Therefore, even seemingly insignificant changes can require, essentially, a reworking of the entire global framing plan. Consequently, framing is often one of the most expensive, time-consuming, and error-prone stages of the construction process. In addition, as more and more types of materials, customer preferences, building features, appliances, monitoring systems, the Internet Of Things, and building add-ons have become available to customers, and are demanded by customers, the variables, constraints, and parameters that are dynamically interconnected and now must be taken into consideration in any construction process can easily number in the millions, or tens of millions. Therefore, it is virtually impossible for any human being, or team of human beings, to realistically take into consideration all the possible framing plans that meet the requirements, much less to evaluate or make recommendations as to which of all possible framing plans best meet the needs for the current construction project and the customers desires.

There are, of course, Computer Aided Design (CAD) systems available to help a building designer develop a framing layout for a given project. However, currently available CAD framing layout systems are relatively static and generally simply provide the designer a capability to move components around and try out various framing layouts on a "one at a time" basis. Consequently, using these currently available CAD systems the various alternative framing layouts and changes to those layouts can be evaluated, but the process of ensuring the cohesiveness of the entire layout or the ripple effects of any changes are taken into consideration is largely dependent on the designer's experience, skill, and efforts. In addition, the quality of any initial layouts is also largely dependent on the designer's experience, skill, and efforts. This is not only problematic in terms of the amount of time and energy that is required to develop both an initial framing layout and any modifications to that framing layout, but it also dictates that the designer have significant experience and the ability to recognize what the likely ripple effects are of any given change. Then the designer must go back and, often manually, make the changes based on that designer's knowledge of the various constraints and parameters involved and the practicality of developing a framing plan that can be easily implemented in the field. Designers with this needed experience and skill level to both develop initial framing layouts and modifications to framing layouts have always been few and far between. However, as the population ages and many skilled designers are leaving the workforce, highly skilled and experienced designers are getting even harder to find. Consequently, the level of human skill required is often very difficult to find and therefore designer skill levels can vary significantly from designer to designer.

Consequently, currently available CAD framing layout systems do not readily lend themselves to efficiently and dynamically creating and modifying multiple framing layouts. In addition, they typically do not provide a mechanism for the designer and/or customer to easily compare various framing layouts based on the desires and needs of the designer or customer and then provide various options to designer or customer. In short, currently available CAD framing layout systems are relatively static and lack the flexibility to provide either the designer or the end customer with multiple possible solutions based on defined parameters or provide the designer or customer with an indication of the strengths and weaknesses of multiple possible framing layouts.

What is needed is a technical solution to the long-standing technical problem of effectively and efficiently generating a set of framing plans for a construction project that take into account all of the variables associated with the construction project and are determined to best fit the customized needs and desires of the designer and/or customer associated with the construction project.

SUMMARY

Embodiments of the present disclosure provide a solution to the long-standing technical problem of effectively and efficiently generating a set of framing plans for a building construction project that is capable of considering all of the variables associated with the construction project and to best meet the customized needs and desires of the designer and/or customer associated with the construction project.

In one embodiment, the solution includes an enhanced framing layout tool to help designers find the most desirable framing configuration by considering a wide array of alternatives and presenting the calculated best options to the user for consideration. To this end, in one embodiment, input plan data representing initial/basic floor or wall geometry and engineering information is first obtained from one or more external or parent CAD programs. In one embodiment, the input plan data representing initial floor or wall geometry and engineering information is then analyzed to identify regions or zones having uniform loading and common boundaries and construction parameters as well as physical or code-based constraints. Region/zone data is then generated representing the input plan data with the regions/zones included.

In one embodiment, each identified region or zone in the region/zone data is analyzed to generate solutions data for that region or zone. In one embodiment, the solutions data for each region or zone represents one or more framing solutions for that region or zone. In one embodiment, once solutions data is generated for each region or zone, the solutions data for each region or zone is processed to harmonize each solution for each region or zone with each of the solutions for all other regions or zones. As a result of this processing, intermediate framing plan solutions data is generated representing one or more intermediate framing plan solutions for the project. In accordance with the disclosed embodiments, the intermediate framing plan solutions data includes data representing all possible framing plan solutions without regard to cost or other user selected and/or weighted parameters and constraints. In one embodiment, at this stage of the disclosed process, the only constraints/filters applied to the one or more intermediate framing plan solutions for the project are actual physical requirements and code requirements. Consequently, as discussed in more detail below, the number of intermediate framing plan solutions represented in the intermediate framing plan solutions data at this stage of the process will often include millions, or even billions, of possible intermediate framing plan solutions for the project.

In one embodiment, once the intermediate framing plan solutions data is generated, each of the intermediate framing plan solutions represented in the intermediate framing plan solutions data is analyzed to identify beams, beam types, and beam dimensions required by each intermediate framing plan solution represented in the intermediate framing plan solutions data. Once beam analysis is performed for each of the intermediate framing plan solutions, the resulting set of intermediate and beam analyzed framing plan solutions are stored as possible framing plan solutions data which represents all the possible framing plan solutions. It is again worth noting that, in one embodiment, the only constraints/filters applied to the possible framing plan solutions represented in the possible framing plan solutions data for the project are actual physical requirements, code requirements, and beam considerations. Consequently, possible framing plan solutions represented in the possible framing plan solutions data for the project at this stage of the process will still often include millions, or even billions, of possible framing plan solutions.

In one embodiment, either before, concurrently, or after the possible framing plan solutions data is generated, available constraints are identified and available constraints data representing the available constraints is generated. In one embodiment, desired and/or applicable available constraints are then selected to generate selected constraints data. In one embodiment, the selected constraints represented in the selected constraints data are then weighted by the user and weighted selected constraints data is generated representing the weighted selected constraints.

In addition, in one embodiment, the selected constraints represented in the selected constraints data are also compared with product cost and availability information represented by product cost/availability data.

In one embodiment, once the weighted selected constraints data and possible framing plan solutions data is generated, the possible framing plan solutions data is processed using the weighted selected constraints data to generate constraints filtered framing plan solutions data. In accordance with the disclosed embodiments, the constraints filtered framing plan solutions data represents filtered framing plan solutions that meet, or most closely match, the weighted selected constraints data.

It is worth noting that, in accordance with the disclosed embodiments, the filtered framing plan solutions data represents framing solutions that are, for the first time in the process, filtered according to the designer/customer selected constraints/parameters as weighted for importance by the designer/customer. Therefore, in many cases the number of filtered framing plan solutions represented in filtered framing plan solutions data may still be in the hundreds, thousands, or even millions.

In one embodiment, once the filtered framing plan solutions data is generated, each filtered framing plan represented in the filtered framing plan solutions data is analyzed using the weighted selected constraints. Then each filtered framing plan solution is ranked according to how closely the filtered framing plan solution matches the weighted selected constraints indicated in the weighted selected constraints data.

In one embodiment, top ranked filtered framing plan solutions data representing a defined number of top ranked filtered framing plan solutions is then provided to the user, i.e., designer or customer, either directly or through a parent, or external, CAD system. In one embodiment, the top ranked filtered framing plan solutions data includes various summary data as discussed in more detail below.

Consequently, the disclosed embodiments include a method and system for presenting framing plan results to help a user, e.g., the designer or customer, efficiently select their preferred framing solution. The presentation of results provides the user the ability to tune the framing plan solutions presented to suit their preferences. In one embodiment, this is achieved via a combination of performance attribute filters/constraints and a ranking system that together are responsible for presenting the framing plan alternatives in a logical manner that considers factors that the user considers most important. Therefore, embodiments of the present disclosure provide a solution to the long-standing technical problem of effectively and efficiently generating a set of framing plans for a construction project that not only take into account all of the variables associated with the construction project but that also are determined to best meet the customized needs and desires of the designer and/or customer associated with the construction project.

In addition, the disclosed technical solution provides a set of framing plans for a building construction project that are ranked according to input from the designer and/or customer regarding the relative importance of each of the constraints, parameters, and variables of the building construction project. Consequently, the disclosed embodiments provide the flexibility and holistic approach to determining a "best" framing plan for a given construction project that cannot be provided using strictly human resources or currently available CAD design systems.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 6B shows several additional specific illustrative examples of intermediate framing plan solutions data in the form of several possible vertical region-based framing plan intermediate framing plan solutions for the entire floor of the volume plan layout of FIG. 2B as generated in accordance with one embodiment.

Figure 2A:
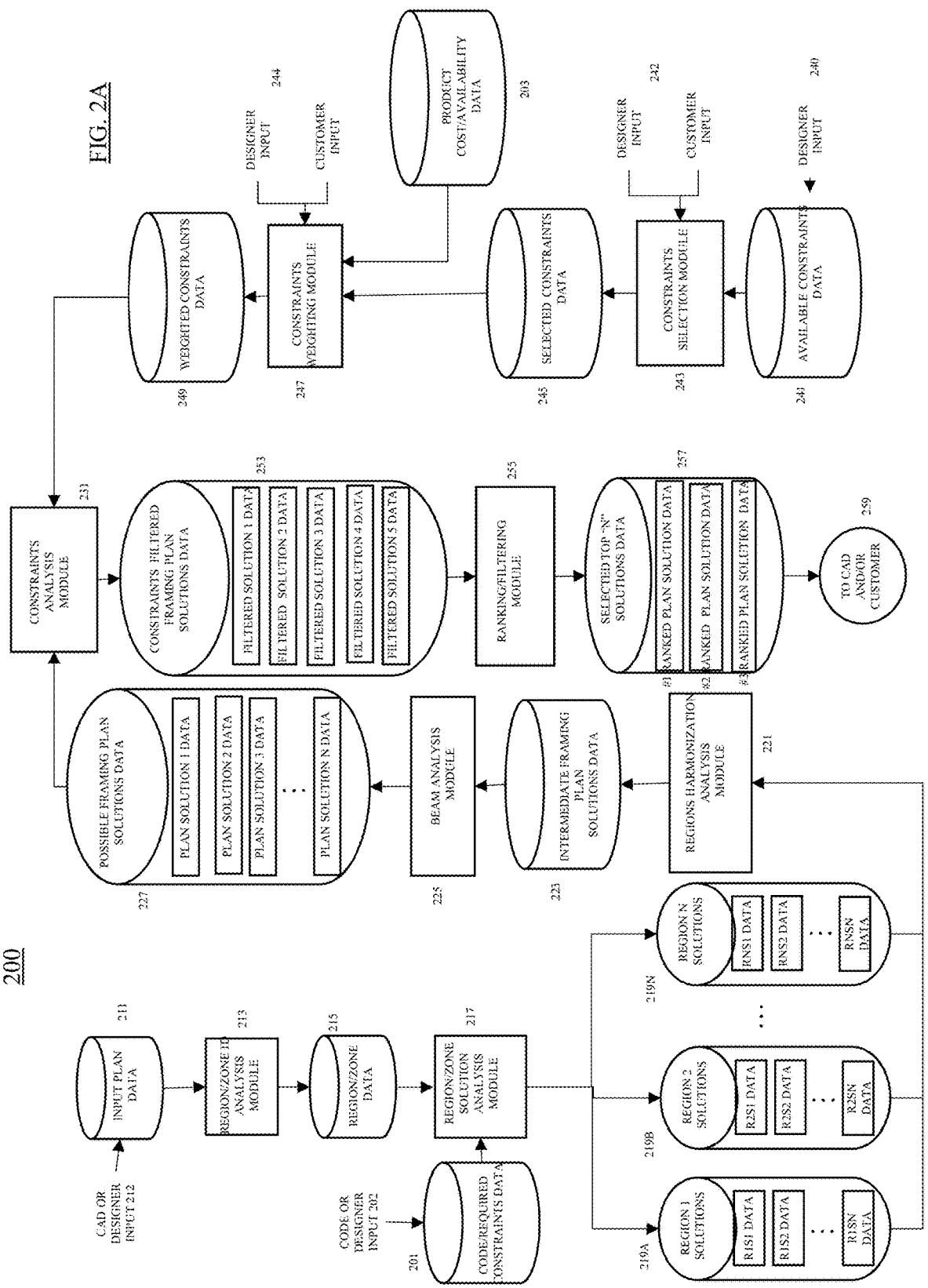
FIG. 2A is a simplified block diagram of a system for generating construction framing solutions in accordance with one embodiment.
Figure 2B:
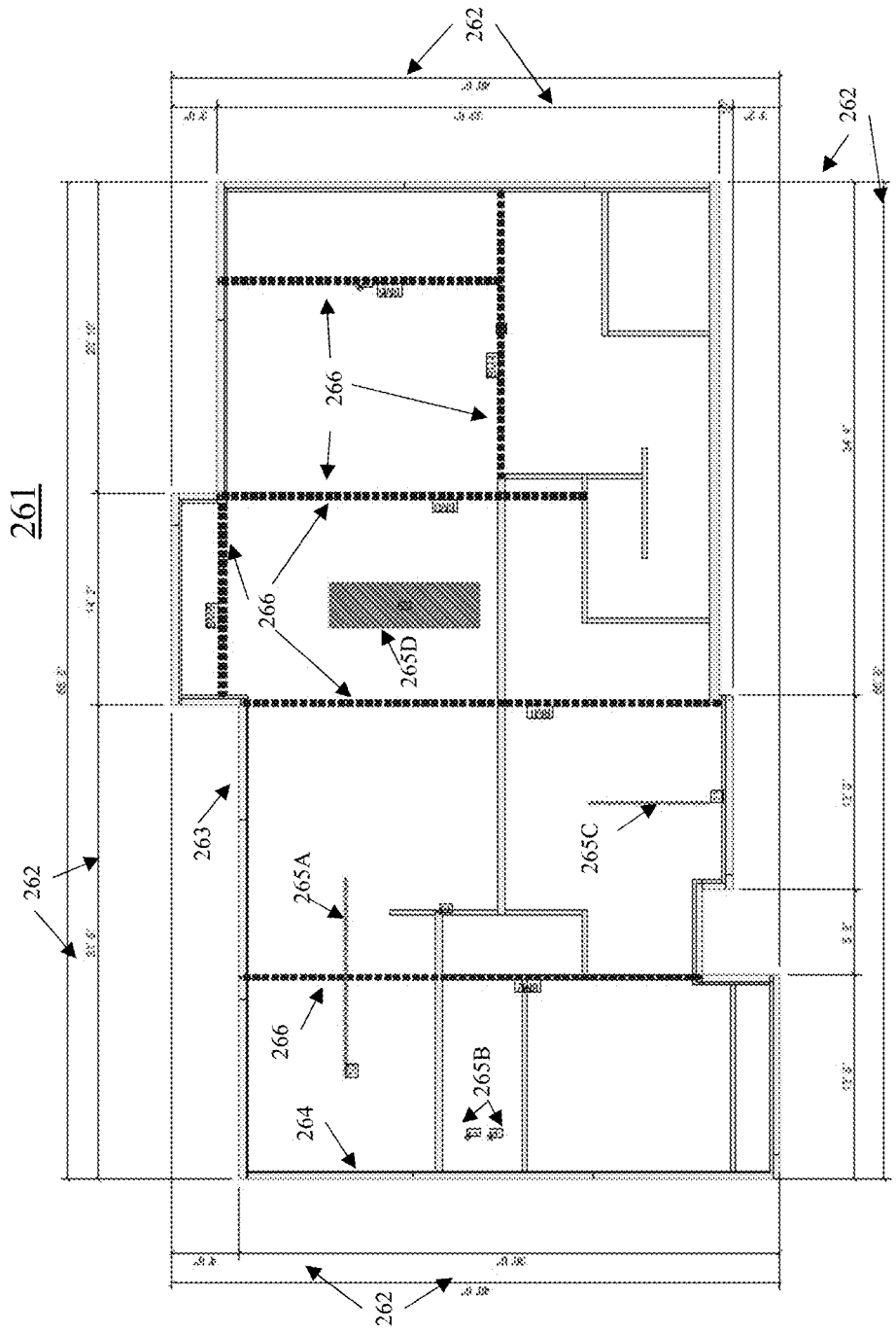
FIG. 2B shows one specific illustrative example of input plan data in the form of a volume plan layout as would be represented by one specific illustrative example of input plan data for a floor framing project including initial illustrative floor plan representations in accordance with one embodiment.
Figure 7:
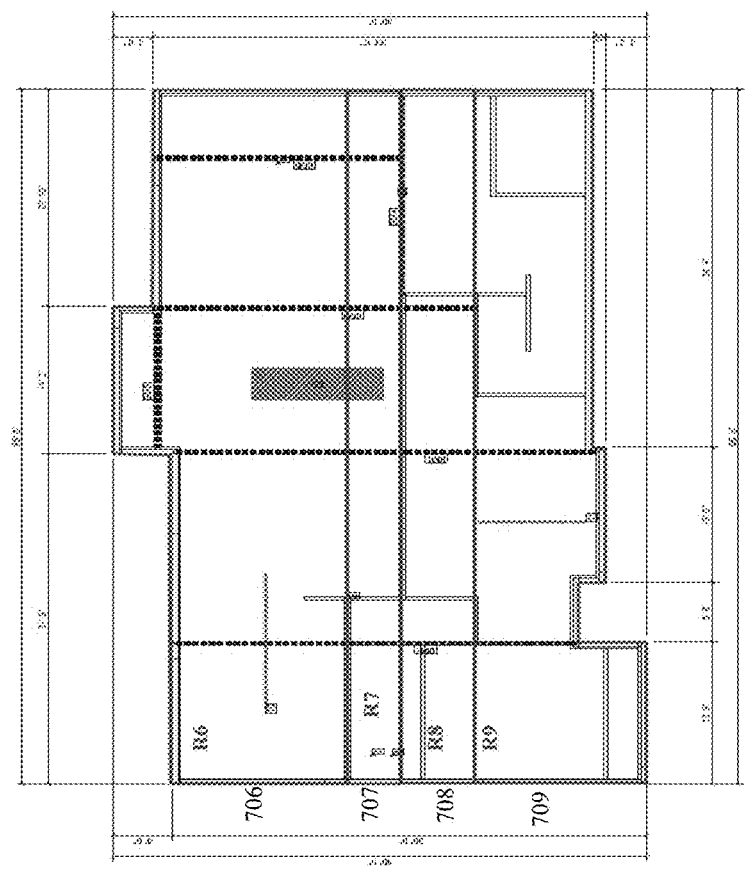
FIG. 7 shows one specific illustrative example of the volume plan layout of FIG. 2B with added horizontal regions as would be represented by one specific illustrative example of region/zone data for a floor framing project including a sample region as generated in accordance with one embodiment.
Figure 8A:
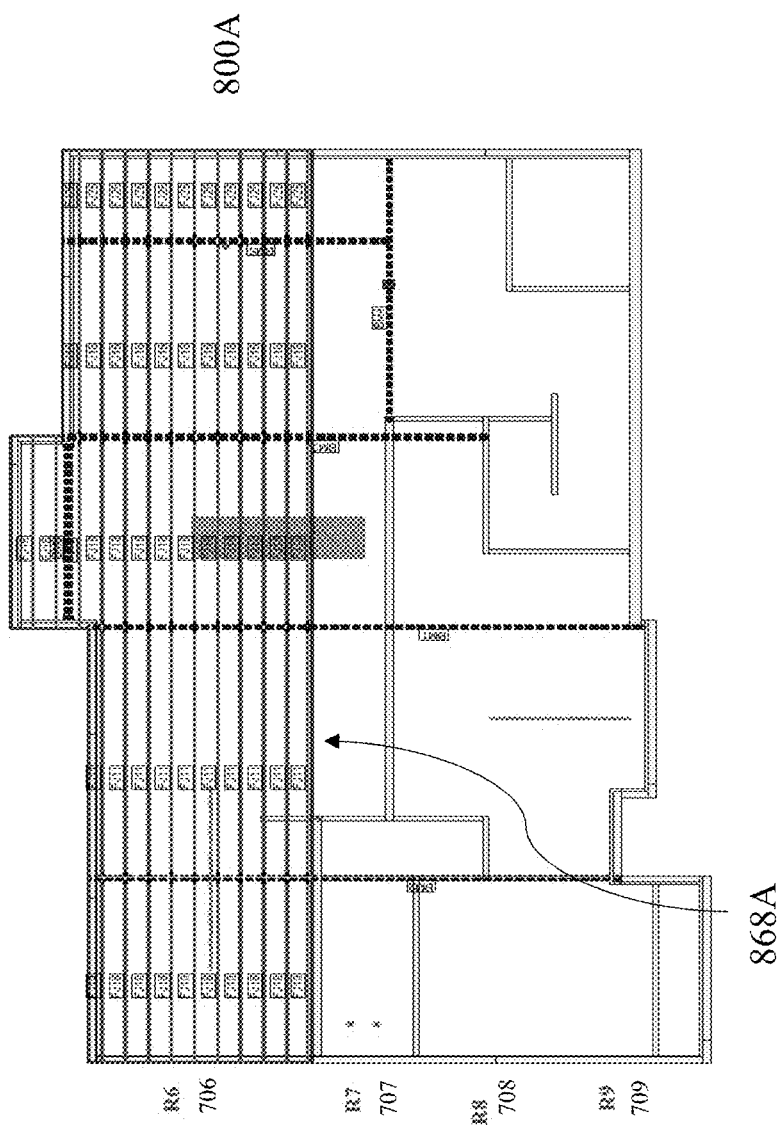
FIG. 8A shows one specific illustrative example of solutions data in the form of one solution for the horizontal R6 region shown in FIG. 7 of the volume plan layout of FIG. 2B as would be represented by one specific illustrative example of solutions data as generated in accordance with one embodiment.
Figure 8B:
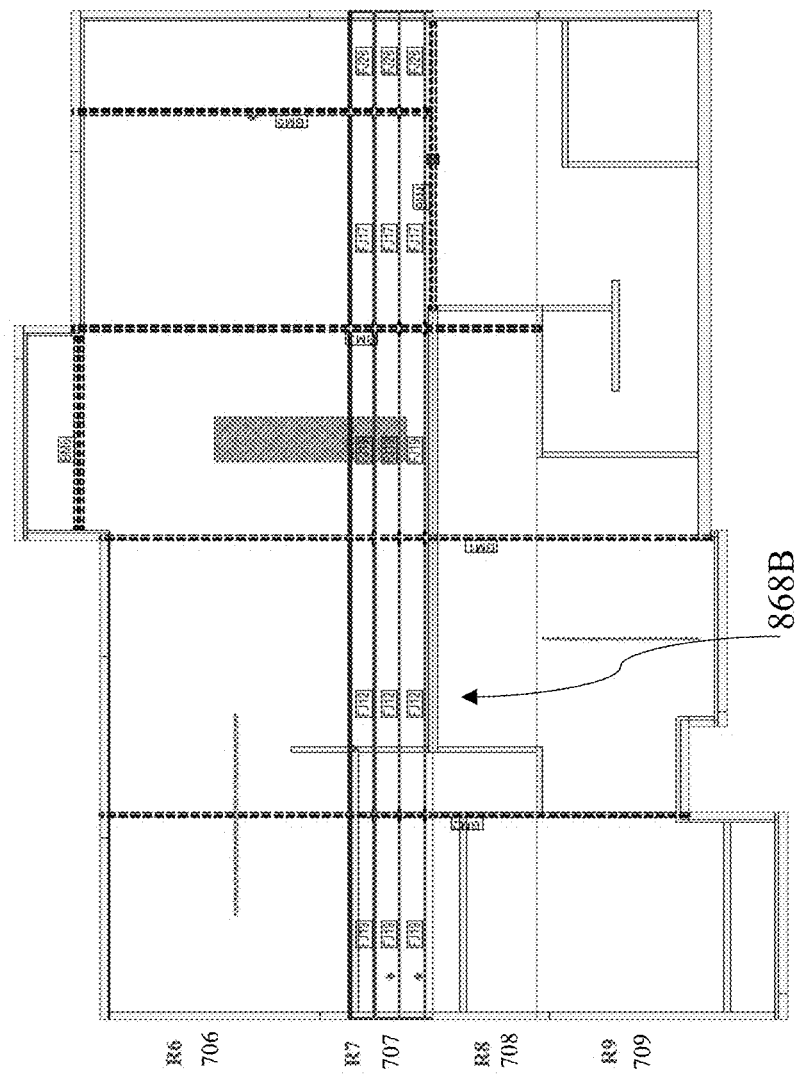
FIG. 8B shows one specific illustrative example of solutions data in the form of one solution for the horizontal R7 region shown in FIG. 7 of the volume plan layout of FIG. 2B as would be represented by one specific illustrative example of solutions data as generated in accordance with one embodiment.
Figure 8C:
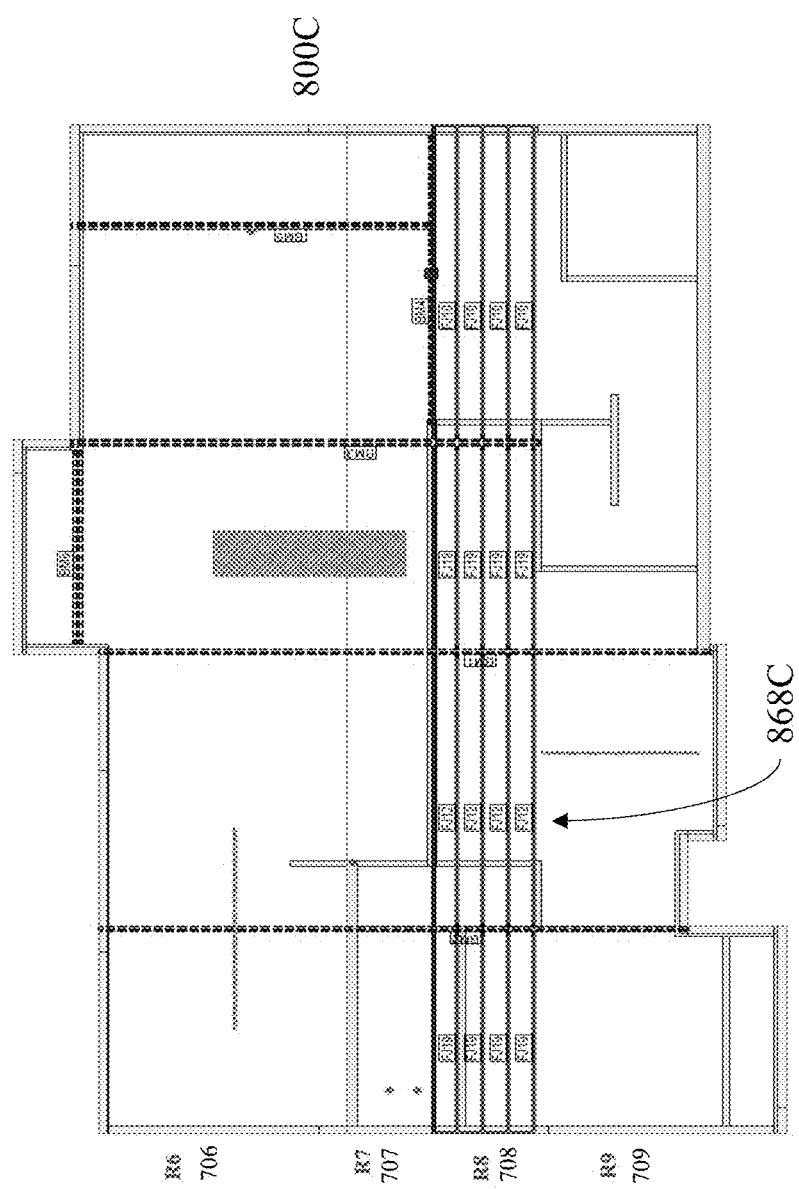
FIG. 8C shows one specific illustrative example of solutions data in the form of one solution for the horizontal R8 region shown in FIG. 7 of the volume plan layout of FIG. 2B as would be represented by one specific illustrative example of solutions data as generated in accordance with one embodiment.
Figure 8D:
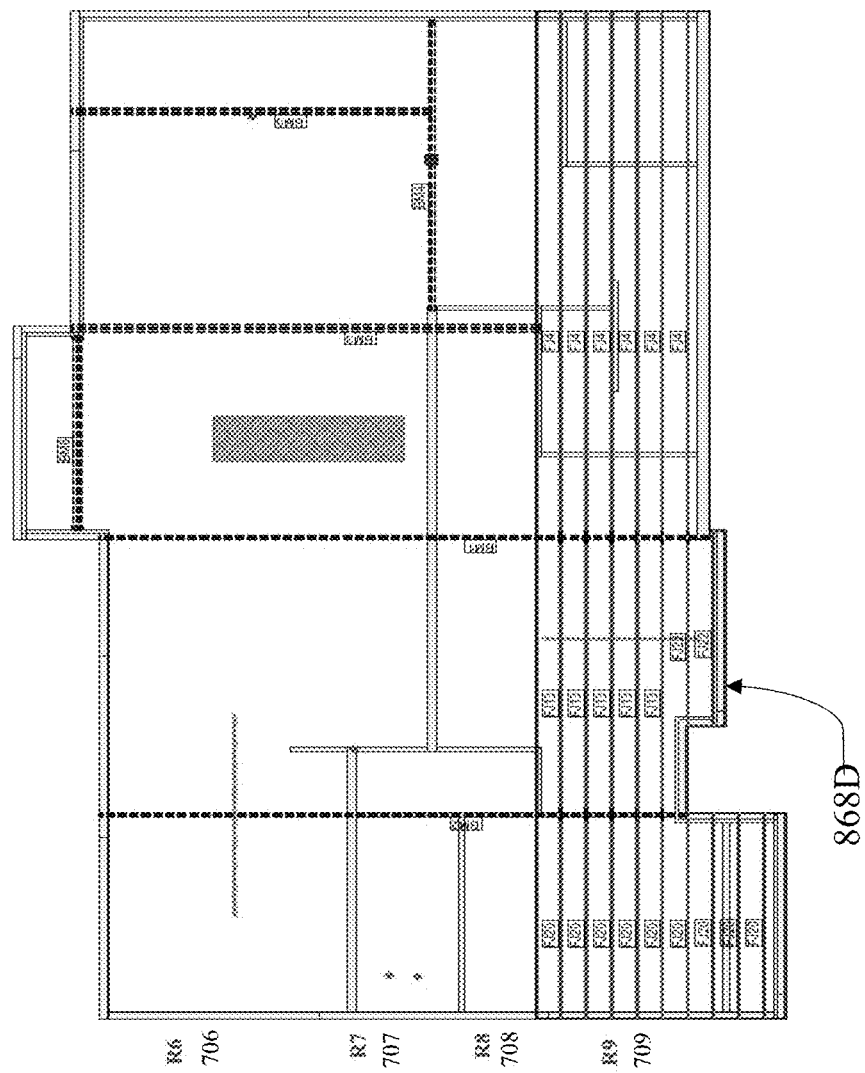

FIG. 8D shows one specific illustrative example of solutions data in the form of one solution for the horizontal R9 region shown in FIG. 7 of the volume plan layout of FIG. 2B as would be represented by one specific illustrative example of solutions data as generated in accordance with one embodiment.

FIG. 9 shows illustrative example of solutions data in the form of several additional solutions for the horizontal R6 region shown in FIG. 7 of the volume plan layout of FIG. 2B as would be represented by one specific illustrative example of solutions data as generated in accordance with one embodiment.

Figure 10A:
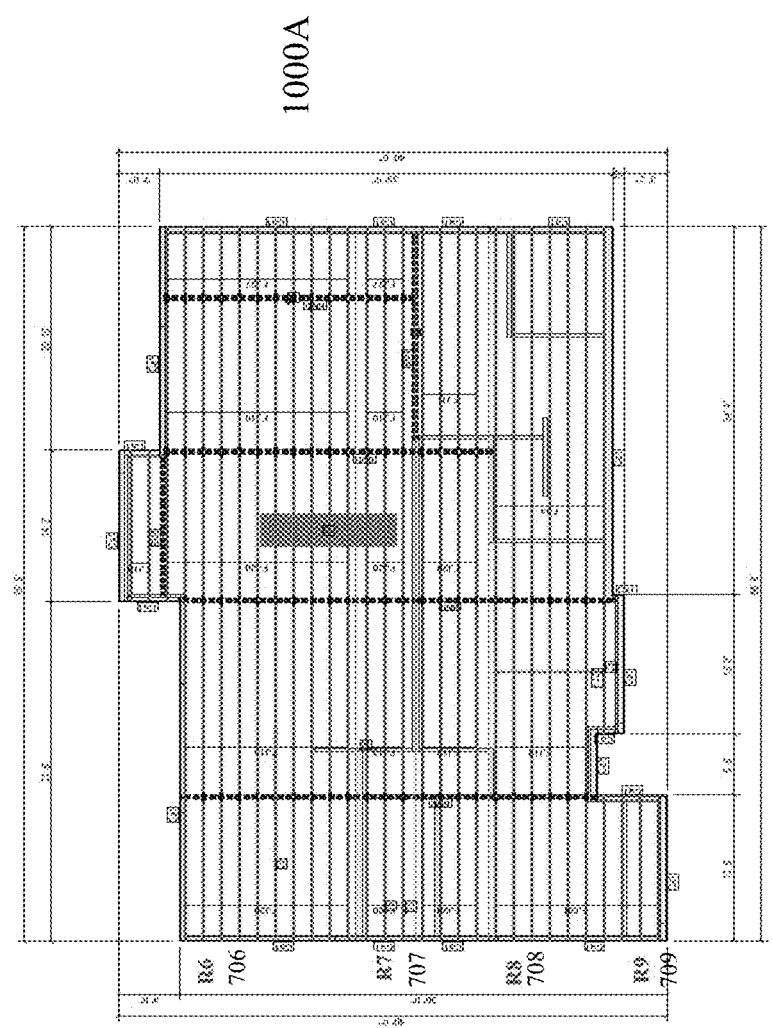

FIG. 10A shows one specific illustrative example of intermediate framing plan solutions data in the form of one possible horizontal region-based framing plan intermediate framing plan solutions for the entire floor of the volume plan layout of FIG. 2B as generated in accordance with one embodiment.

FIG. 10B shows one specific illustrative example of intermediate framing plan solutions data in the form of several additional specific illustrative examples of possible horizontal region-based intermediate framing plan solutions for the entire floor of the volume plan layout of FIG. 2B as generated in accordance with one embodiment.

Figure 11A:
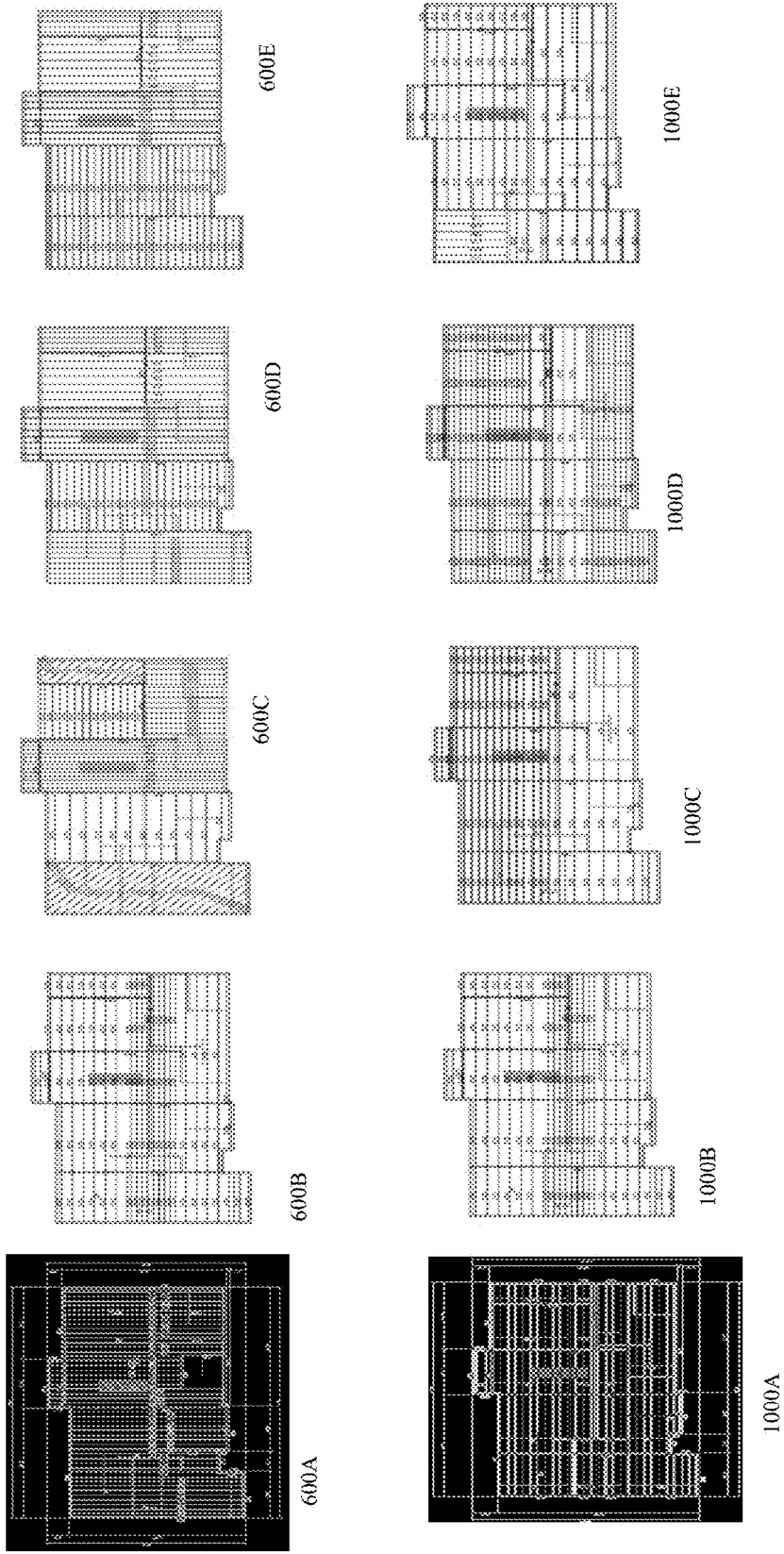

FIG. 11A shows one simplified illustrative example of possible framing plan solutions data in the form of the ten possible framing plan solutions resulting after beam analysis of the intermediate framing plan solutions of FIGS. 6A, 6B, 10A, and 10B.

Figure 11B:
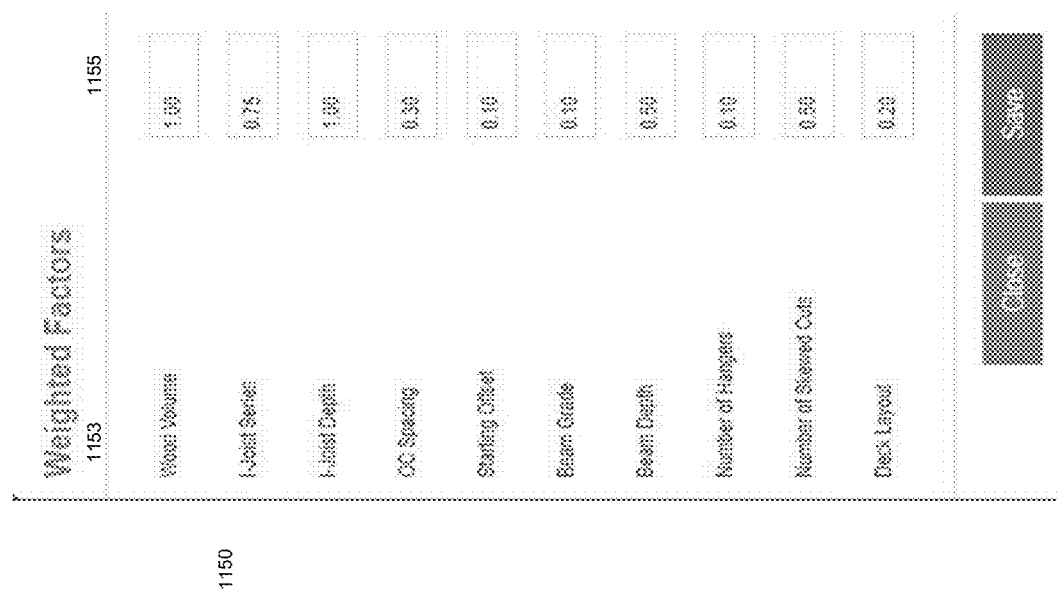

FIG. 11B shows a constraints selection and weighting user interface that could be provided by a constraints weighting module to generate weighted constraints data in accordance with one embodiment.

Figure 12:
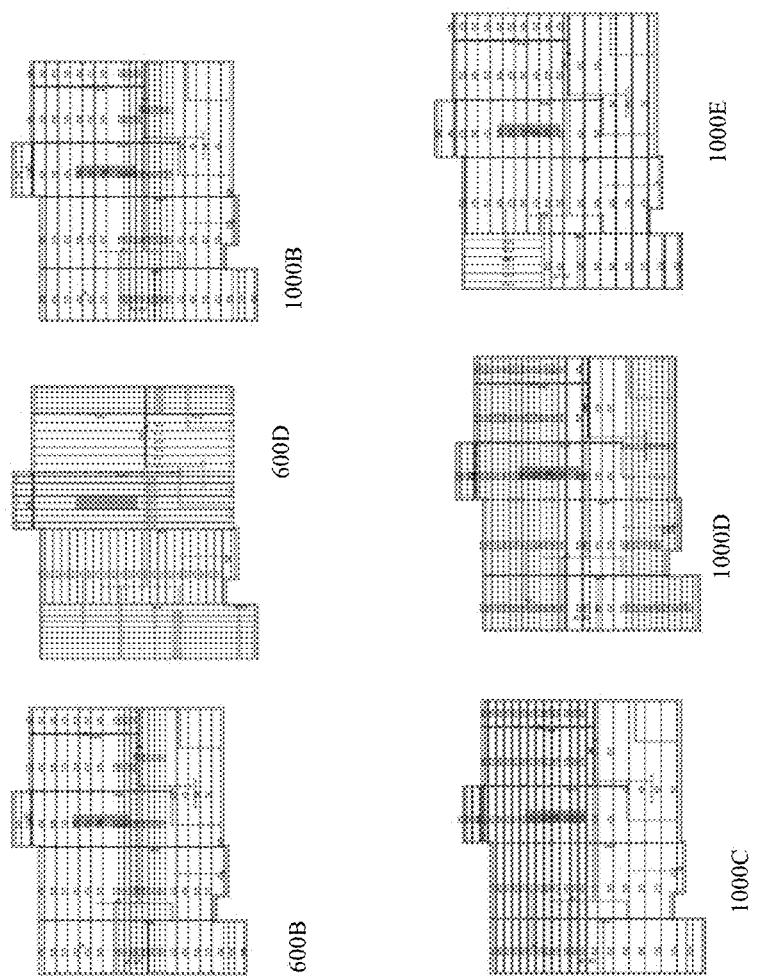

FIG. 12 shows constraints filtered framing plan solution data in the form of six constraints filtered framing plan solution filtered from the intermediate framing plan solutions of FIGS. 6A, 6B, 10A, and 10B using the weighted constraints data of FIG. 11B.

Figure 13A:
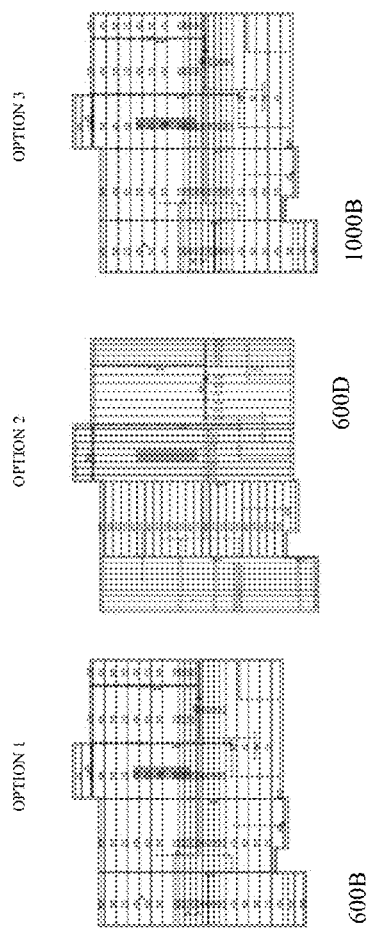

FIG. 13A shows selected top three solution data in the form of the selected top three solutions filtered from the intermediate framing plan solutions of FIGS. 6A, 6B, 10A, and 10B after processing by a ranking filtering module.

Figure 13B:
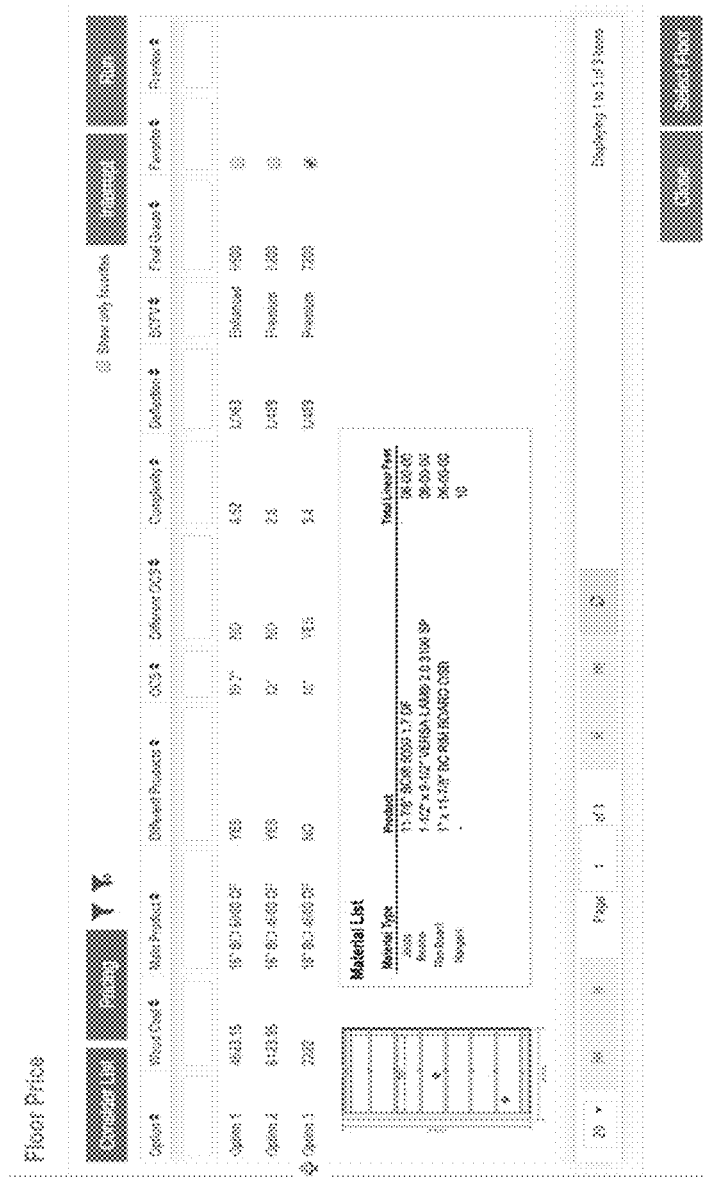

FIG. 13B shows an illustrative example of summary data listing the top three selected framing solutions of FIG. 13A in accordance with one embodiment.

Common reference numerals are used throughout the figures and the detailed description to indicate like elements. One skilled in the art will readily recognize that the above figures are merely illustrative examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying figures, which depict one or more exemplary embodiments. Embodiments may be implemented in many different forms and should not be construed as limited to the embodiments set forth herein, shown in the figures, or described below. Rather, these exemplary embodiments are provided to allow a complete disclosure that conveys the principles of the invention, as set forth in the claims, to those of skill in the art.

DEFINITIONS

As used herein the term "region" of a framing plan includes an area of floor, wall, etc., of the framing plan, which can include the entire floor/wall to be framed, and/or that includes a physical boundary within the cavity on all sides formed by walls, flush beams, etc. A region can be defined as an area that has uniform loading and or other construction restraints. As one specific illustrative example, an additional region is created when a flush beam is added below a point load.

As used herein the term "zone" includes areas similar to a "region" but that lack the physical boundary on one or more sides because it is not defined by a fixed member in the cavity, the members are freely spaced within the zone, e.g., starting offset/OCS are variables. As a specific illustrative example, an area load creates a zone where the starting offset and OCS are part of the solution parameters.

As used herein the term "division" includes a cut or partitioning of a region due to one or more of the following: a user input flush beam, e.g., fixed position of members; an opening, e.g., fixed position of members; a linear load, e.g., fixed member along the axis; a point load, e.g. a fixed member along the axis of the overall floor or wall plan; a long span, e.g., because a span is longer than a defined maximum, or added perpendicular member(s) relative to the overall floor/wall axis located at defined intervals; partial area load, e.g., no fixed members, OCS and starting offset are variables; and any other similar partitioning elements. As used herein the term "division" can be used interchangeably with the term "region," e.g., a division can create one or more regions. Each division, region, or zone, results in a multiplier on the total number of solutions. In addition, divisions, regions, or zones often create dependencies with other divisions, regions, or zones that create illogical outcomes and thus leads to the opportunity to reduce the number of solutions based on the application of constraints that govern when a particular solution should be considered. Example, long span triggers divisions however there is no need to consider framing for this condition in the regions that are created by the division in a direction other than parallel to the original framing that necessitated the division in the first place.

As used herein, anchor regions are regions that are determined to include the most structural constraints and limitations based on a combination of factors including spans, load(s) and/or physical boundaries (walls, beams, openings, plumbing or other obstructions and the like). Likewise, anchor zones are zones within an anchor region that include the structural constraints and limitations.

Process

Figure 1:
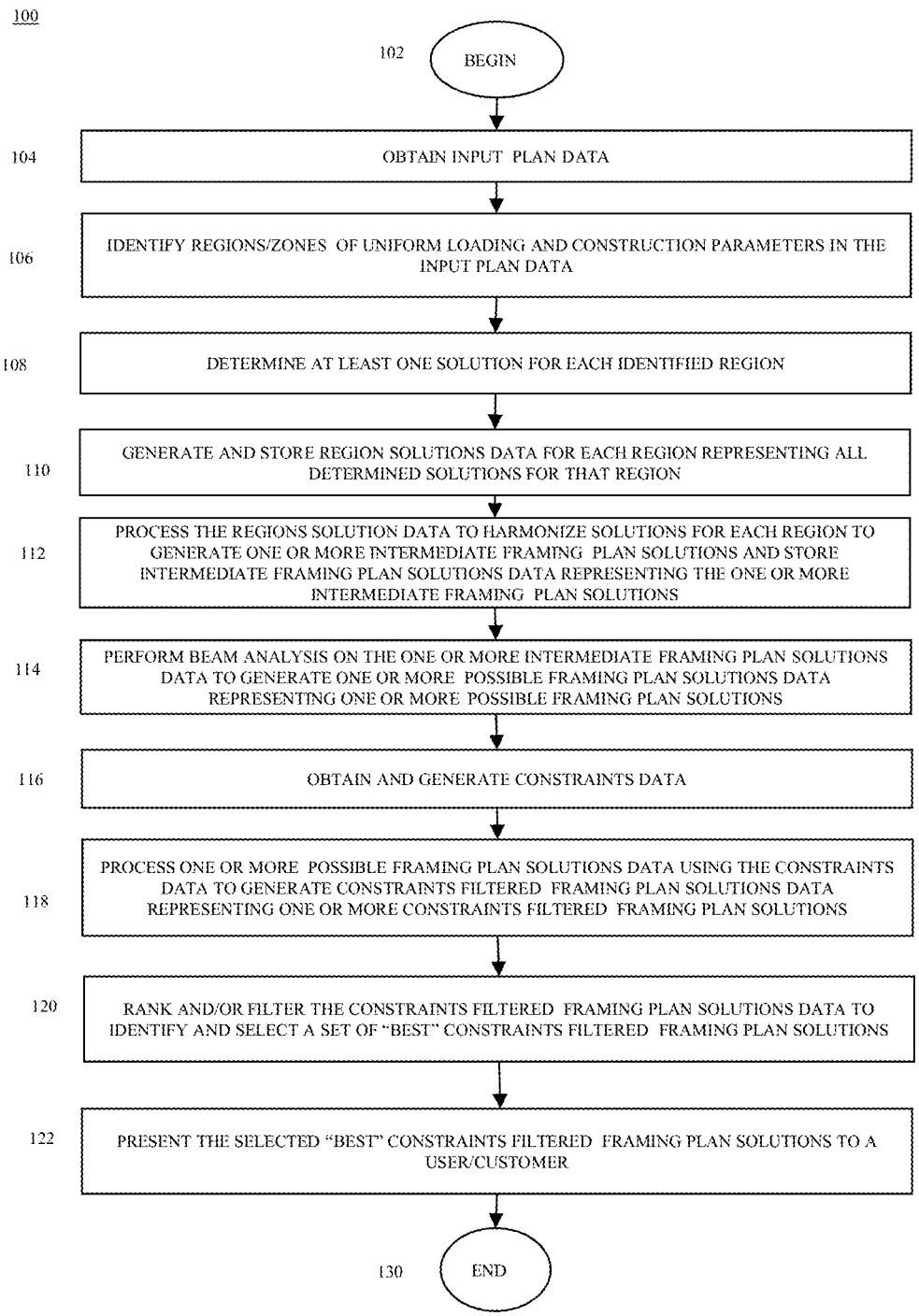
FIG. 1 is a flow chart of a process for generating construction framing solutions in accordance with one embodiment.

FIG. 1 is flow chart of a process for generating construction framing solutions in accordance with one embodiment.

As seen in FIG. 1, process 100 begins at BEGIN operation 102 and then process proceeds to operation 104.

In one embodiment, at operation 104, input plan data representing initial floor or wall geometry and engineering data is first obtained from one or more external or parent CAD programs (see FIGS. 2B and 2C discussed in more detail below). In various embodiments, the one or more CAD programs are the prior art CAD systems discussed above, known in the art at the time of filing, and/or as become known after the time of filing. In various embodiments, the one or more CAD programs are parent systems for the disclosed process for generating construction framing solutions.

In one embodiment, once input plan data representing initial floor or wall geometry and engineering data is obtained at operation 104, process flow proceeds to operation 106.

In one embodiment, at operation 106, the input plan data representing initial floor or wall geometry and engineering information is analyzed to identify regions or zones having uniform loading, similar loading, same or similar adjacencies, and/or common boundaries and construction parameters. Region/zone data is then generated representing the input plan data with the regions/zones included (see FIGS. 3A, 3B, 3C, and 7 as discussed in more detail below).

In one specific illustrative example, region/zone data is generated by:
1. Determining floor volume contour. In this step the entire floor volume full contour is determined. The initial exterior contour of the entire floor volume being analyzed that creates a region is thereby determined; and
2. Identifying beams. In this step beams flush within the floor volume are identified. Each instance of a beam splits a region into two subregions or zones; and
3. Identifying openings. In this step openings in the floor volume are identified, such as stairways and the like, in the floor volume. In one embodiment, each instance of an opening splits a region into four subregions or zones: two outside subregions or zones limited by the trimmers and two inside subregions or zones limited by the headers; and
4. Determining loads: In this step, point, linear, and area loads in the floor volume are identified. In various embodiments, a region is divided into two subregions or zones limited by beams placed strategically under point and linear loads and/or two or more zones without limiting beams for linear or area loads.

In one embodiment, once regions or zones having uniform loading and common boundaries and construction parameters are identified and region/zone data is generated at operation 106, process flow proceeds to operation 108.

In one embodiment, at operation 108, each identified region or zone in the region/zone data is analyzed to generate solutions data for that region or zone (see FIGS. 4A through 4E, 5, and 8A through 8D and 9 discussed below).

In one embodiment, the solutions data for each region or zone represents one or more framing solutions for that region or zone.

In one specific illustrative example, at operation 108, for each region, zone, or subregion identified at 106, region/zone solutions data is generated to find several valid joist placements based on the floor axes and the user's selected joist products as follows.
1. Identify the axes to evaluate and the user's selected joist products.
2. For each axis, step through each series.
3. For each series, step through each on-center spacing.
4. For each on-center spacing, step through each offset starting point.
5. For each offset starting point, step through each ply option.
6. For each ply option:
   i. Create the region contour with beams, rims and walls;
   ii. Frame the region with joists;
   iii. Distribute the point, linear and area loads; and
   iv. Find the smallest product depth such that all joists are structurally compliant with design codes.

In one embodiment, once region/zone solutions data is generated for each region or zone at operation 108, process flow proceeds to operation 110.

In one embodiment, at operation 110, the region/zone solutions data for each region or zone is stored and correlated to its respective region or zone.

In one embodiment, once the solutions data for each region or zone is stored and correlated to each region or zone at operation 110, process flow proceeds to operation 112.

In one embodiment, at operation 112, the region/zone solutions data for each region or zone is compared and processed to harmonize each of the region/zone solutions for each region or zone with each of the solutions for all other regions or zones. Thereby, intermediate framing plan solutions data is generated.

In one specific illustrative example, the harmonization process includes:

For each region/zone, retrieve a top number, e.g., 1000000, matches of its subregions or zones' results merge. Top matches are established based on:
   a. Rejection of unsound framing solutions.
      i. Large number of different products;
      ii. Large difference in product depth;
      iii. Large number of variations of framing axis; and/or
      iv. Large number of different OCS.
   b. Score obtained on matching properties.
      i. Product series;
      ii. Product depth;
      iii. Product plies;
      iv. On center spacing;
      v. Starting offset; and/or
      vi. Parallelism.
   c. Add a region's own uniform results to the list; and
   d. Proceed recursively until all regions/zones results in the framing plan have been harmonized.

The processing of the region/zone solutions data for each region or zone to harmonize each solution for each region or zone with each of the solutions for all other regions or zones results in intermediate framing plan solutions data being generated. In one embodiment, the intermediate framing plan solutions data represents one or more intermediate framing plan solutions for the project (see FIGS. 6A, 6B, 10A and 10B discussed in more detail below). In accordance with the disclosed embodiments, the intermediate framing plan solutions data includes data representing all possible framing plan solutions without regard to cost or other user selected and weighted parameters and constraints.

It is worth noting that, in one embodiment, at operation 112 the only constraints/filters applied to the one or more intermediate framing plan solutions for the project are actual physical requirements and code requirements. Consequently, the number of intermediate framing plan solutions represented in the intermediate framing plan solutions data at this stage of the process will often include millions, or even billions, of possible intermediate framing plan solutions for the project.

In other embodiments, the solutions for various regions and zones are initially analyzed to determine anchor regions or zones (see FIGS. 3A, 3B, 3C, and 7 discussed in more detail below). Typically, these anchor regions or zones are those that are determined to include the most structural constraints and limitations based on a combination of factors including spans, load(s) and/or physical boundaries (walls, beams, openings, plumbing or other obstructions and the like).

In one embodiment, the intermediate framing plan solutions are then determined and constrained to those that are compatible with the solutions for these anchor regions and zones (see FIGS. 6A, 6B, 10A and 10B discussed in more detail below).

Consequently, in one embodiment, at operation 108 the anchor regions or zones are evaluated to determine those likely to govern the intermediate framing plan solutions based on parameters including span, load, geometric obstructions including but not limited to walls, beams, openings or plumbing. These anchor regions or zones are analyzed to generate solutions before the remaining regions or zones are analyzed. In one embodiment, the solutions data for each anchor region or zone represents one or more framing solutions for that anchor region or zone. In one embodiment, the remaining, i.e., non-anchor, regions or zones are then analyzed to generate solutions with an additional constraint of compatibility with the anchor region or zone solutions.

In one embodiment, once the intermediate framing plan solutions data is generated and stored at operation 112, process flow proceeds to operation 114.

In one embodiment, at operation 114, each of the intermediate framing plan solutions represented in the intermediate framing plan solutions data is analyzed to identify beams, beam types, and beam parameters required by each intermediate framing plan solution represented in the intermediate framing plan solutions data. Once beam analysis is performed for each of the intermediate framing plan solutions, the resulting set of intermediate and beam analyzed framing plan solutions are stored as possible framing plan solutions data which represents all the possible framing plan solutions. It is again worth noting that, in one embodiment, at operation 114 the only constraints/filters applied to the possible framing plan solutions represented in the possible framing plan solutions data for the project are actual physical requirements, code requirements, and beam considerations. Consequently, possible framing plan solutions represented in the possible framing plan solutions data for the project at this stage of the process will still often include millions, or even billions, of possible framing plan solutions.

In one specific illustrative example, beam analysis is performed as follows:
1. Identify each beam to size;
2. Collect all loads supported by beam; and
3. Step through beam series, width, depth from smallest to largest via a structural compliance engine until a structurally adequate solution is reached.

In one embodiment, once possible framing plan solutions data is generated at operation 114, process flow proceeds to operation 116.

In one embodiment, either before, concurrently, or after the possible framing plan solutions data is generated at operation 114, available constraints are identified and available constraints data representing the available constraints is generated at operation 116.

In one embodiment, desired and/or applicable available constraints are then selected to generate selected constraints data. In one embodiment, the selected constraints represented in the selected constraints data are then weighted by the user and weighted selected constraints data is generated representing the weighted selected constraints data (see FIG. 11A as discussed below).

In addition, in one embodiment, the selected constraints represented in the selected constraints data are also compared with product cost and availability information represented by product cost/availability data.

In one embodiment, once the weighted selected constraints data is generated at operation 116, process flow proceeds to operation 118.

In one embodiment, at operation 118, the possible framing plan solutions data of operation 114 is processed using the weighted selected constraints data of operation 116 to generate constraints filtered framing plan solutions data. In accordance with the disclosed embodiments, the constraints filtered framing plan solutions data represents filtered framing plan solutions that meet, or most closely match, the weighted selected constraints data (see FIG. 11B as discussed below).

It is worth noting that, in accordance with the disclosed embodiments, the filtered framing plan solutions data of operation 118 represents framing solutions that are for the first time in the process filtered according to the designer/customer selected constraints/parameters as weighted for importance by the designer/customer. Therefore, the set of filtered framing plan solutions represented in filtered framing plan solutions data of operation 118 is likely a smaller sub-set of the possible framing plan solutions represented in the possible framing plan solutions data of operation 114. However, in many cases the number of filtered framing plan solutions represented in filtered framing plan solutions data may still be in the hundreds, thousands, or even millions.

In one embodiment, once the filtered framing plan solutions data is generated at operation 118, process flow proceeds to operation 120.

In one embodiment, at operation 120, each filtered framing plan represented in the filtered framing plan solutions data of operation 118 is analyzed again using the weighted selected constraints data of operation 116 and then each filtered framing plan solution is ranked according to how closely the filtered framing plan solution matches the weighted selected constraints indicated in the weighted selected constraints data.

In one embodiment, once each filtered framing plan solution is ranked according to how closely the filtered framing plan solution matches the weighted selected constraints indicated in the weighted selected constraints data at operation 120, process flow proceeds to operation 122.

In one embodiment, at operation 122 the top ranked filtered framing plan solutions data representing a defined number of top ranked filtered framing plan solutions of operation 120 is provided to the user, i.e., designer or customer either directly or through a parent, or external, CAD system (see FIG. 13A as discussed in more detail below). In one embodiment, the top ranked filtered framing plan solutions data includes various summary data (see FIG. 13B as discussed in more detail below).

In one embodiment, once the top ranked filtered framing plan solutions data representing a defined number of top ranked filtered framing plan solutions is provided to the user at operation 122 process flow proceeds to END operation 130 where process 100 is exited to await new samples and/or data.

System

FIG. 2A is a simplified block diagram of a system 200 for generating construction framing solutions in accordance with one embodiment.

Referring to FIG. 2A, in one embodiment, system 200 includes code/required constraints data 201, obtained from building codes or designer input 202. In one embodiment, code/required constraints data 201 represents the minimal physical and legal constraints required to generate a framing/construction plan that is compatible with the laws of physics and local code requirements. In short, code/required constraints data 201 represents the minimal constraints that are mandatory, not variable, and that must be met. This is in contrast to user selected and weighted constraints discussed herein which are customizable based on designer or customer preferences.

In one embodiment, input plan data 211 representing initial floor or wall geometry and engineering information is obtained from one or more parent or external CAD programs 212. In various embodiments, the one or more CAD programs 212 are the prior art CAD systems discussed above. In various embodiments, the one or more CAD programs 212 are the parent systems for the disclosed process and system for generating construction framing solutions.

In one embodiment, input plan data 211 represents an initial volume plan layout for the construction project prior to the calculation and insertion of any framing plan.

FIG. 2B shows one specific illustrative example of a volume plan layout 261 as would be represented by one specific illustrative example of input plan data 211 for a floor framing project including initial illustrative floor plan representations 261.

As seen in FIG. 2B, volume plan layout 261 is a 3D model with various annotations. FIG. 2C shows a specific illustrative example of xml data 271 for one of the beams in volume plan layout 261 of FIG. 2B describing all of that beam's attributes. In one specific illustrative example of xml data, each object in plan layout 261 is described in a similar way.

Referring to FIG. 2B, volume plan layout 261 includes dimensional values 262 defining the geometry of the floor plan of volume plan layout 261. Also seen in FIG. 2B is perimeter 263 (light blue lines) of volume the floor plan of volume plan layout 261 to be filled in with framing members.

Also shown in FIG. 2B are structure/wall representations 264 (tan or grey lines) of the floor plan of volume plan layout 261 indicating a structure/wall below displayed floor volume and possible structural support.

Also shown in FIG. 2B are discrete load symbols 265A though 265D (pink lines, diamonds, or hatching) indicating discrete loads applied to the surface of the floor plan of volume plan layout 261 that must be considered in any solution. In the specific example of FIG. 2B, 265A represents a linear load, 265B represents concentrated loads, 265C represents a linear load, and 265D represents an area load.

Also shown in FIG. 2B are beam indicators 266 (dark blue dashed lines) indicating a beam in or below the floor plan of volume plan layout 261. These represent a constraint to be applied to any potential solution for the floor plan of volume plan layout 261.

Returning to FIG. 2A, in one embodiment, once input plan data 211 representing initial floor or wall geometry and engineering information is obtained, input plan data 211 then analyzed by one or more algorithms included in region/zone analysis ID module 213 to identify regions or zones and/or divisions having uniform loading and common boundaries and construction parameters. Region/zone data 215 representing the input plan data with the regions/zones included is then generated and stored.

As noted above, in one specific illustrative example, regions zone data is generated by:
1. Determining floor volume contour. In this step the entire floor volume full contour is determined. The initial exterior contour of the entire floor volume being analyzed that creates a region is thereby determined.
2. Identifying beams. In this step beams flush within the floor volume are identified. Each instance of a beam splits a region into two subregions or zones.
3. Identifying openings. In this step openings in the floor volume are identified, such as stairways and the like, in the floor volume. In one embodiment, each instance of an opening splits a region into four subregions or zones: two outside subregions or zones limited by the trimmers and two inside subregions or zones limited by the headers.
4. Determining loads: In this step, point, linear, and area loads in the floor volume are identified. In various embodiments, a region is divided into two subregions or zones limited by beams placed strategically under point and linear loads and/or two or more zones without limiting beams for linear or area loads.

Figure 2C:
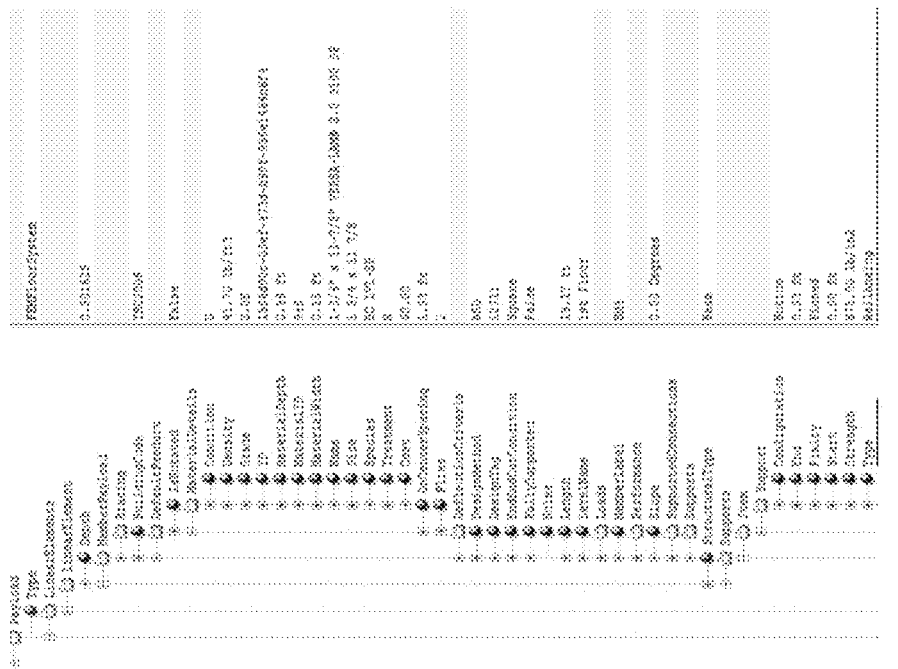
FIG. 2C shows one specific illustrative example of xml input plan data describing a beam in accordance with one embodiment.
Figure 3A:
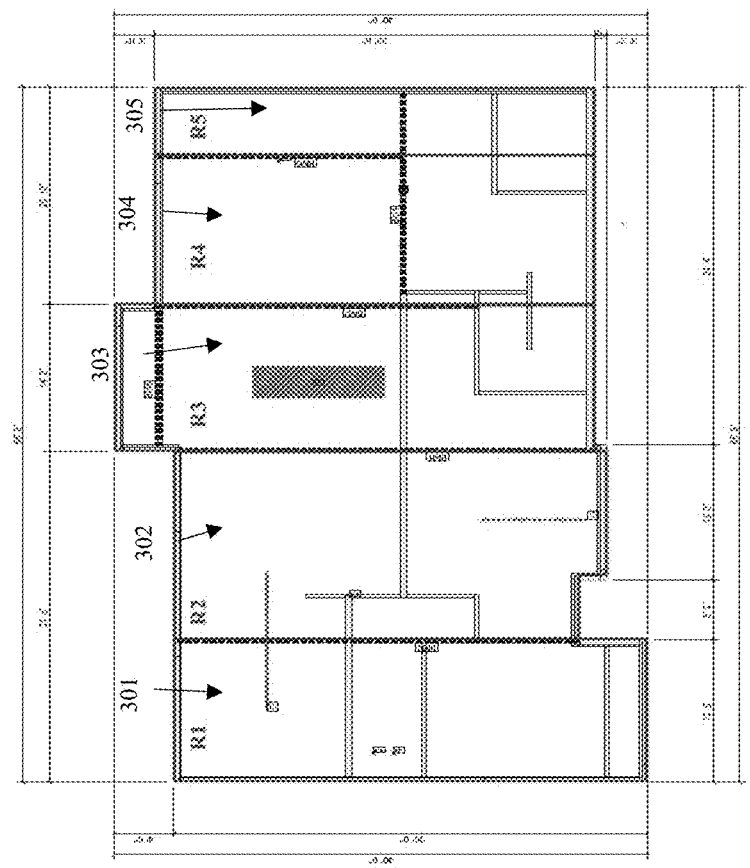
FIG. 3A shows one specific illustrative example of the volume plan layout of FIG. 2B with added vertical regions as would be represented by one specific illustrative example of region/zone data for a floor framing project including a sample region as generated in accordance with one embodiment.

FIG. 3A shows one specific illustrative example 261A of the volume plan layout of FIGS. 2B, 2C, 3A, 3B, and 3C with added regions, zones, and/or divisions as would be represented by one specific illustrative example of region/zone data 215 for a floor framing project.

Figure 3B:
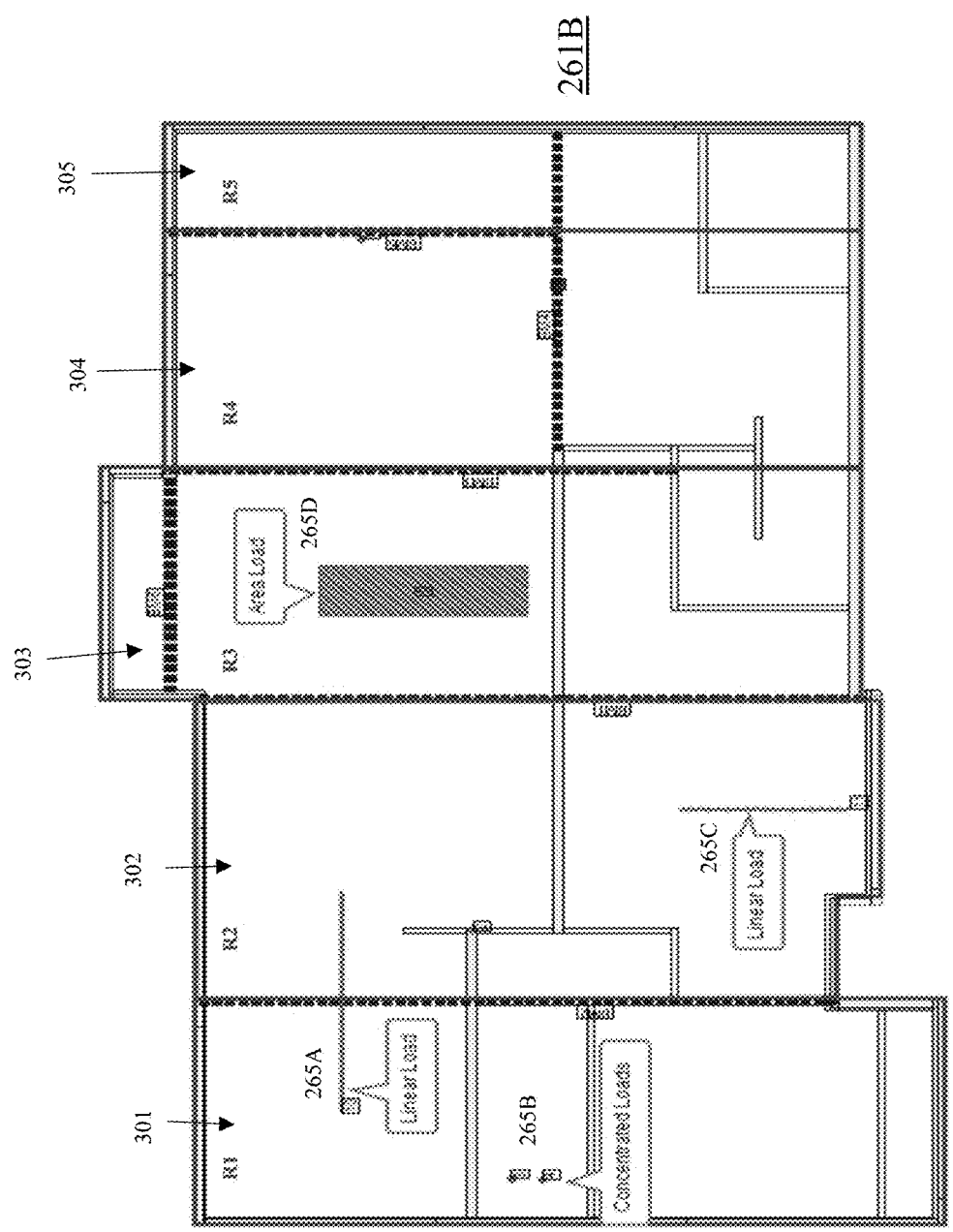
FIG. 3B shows one specific illustrative example of the volume plan layout of FIG. 3A with added vertical loads and load regions as would be represented by one specific illustrative example of region/zone data for a floor framing project including a sample region as generated in accordance with one embodiment.
Figure 3C:
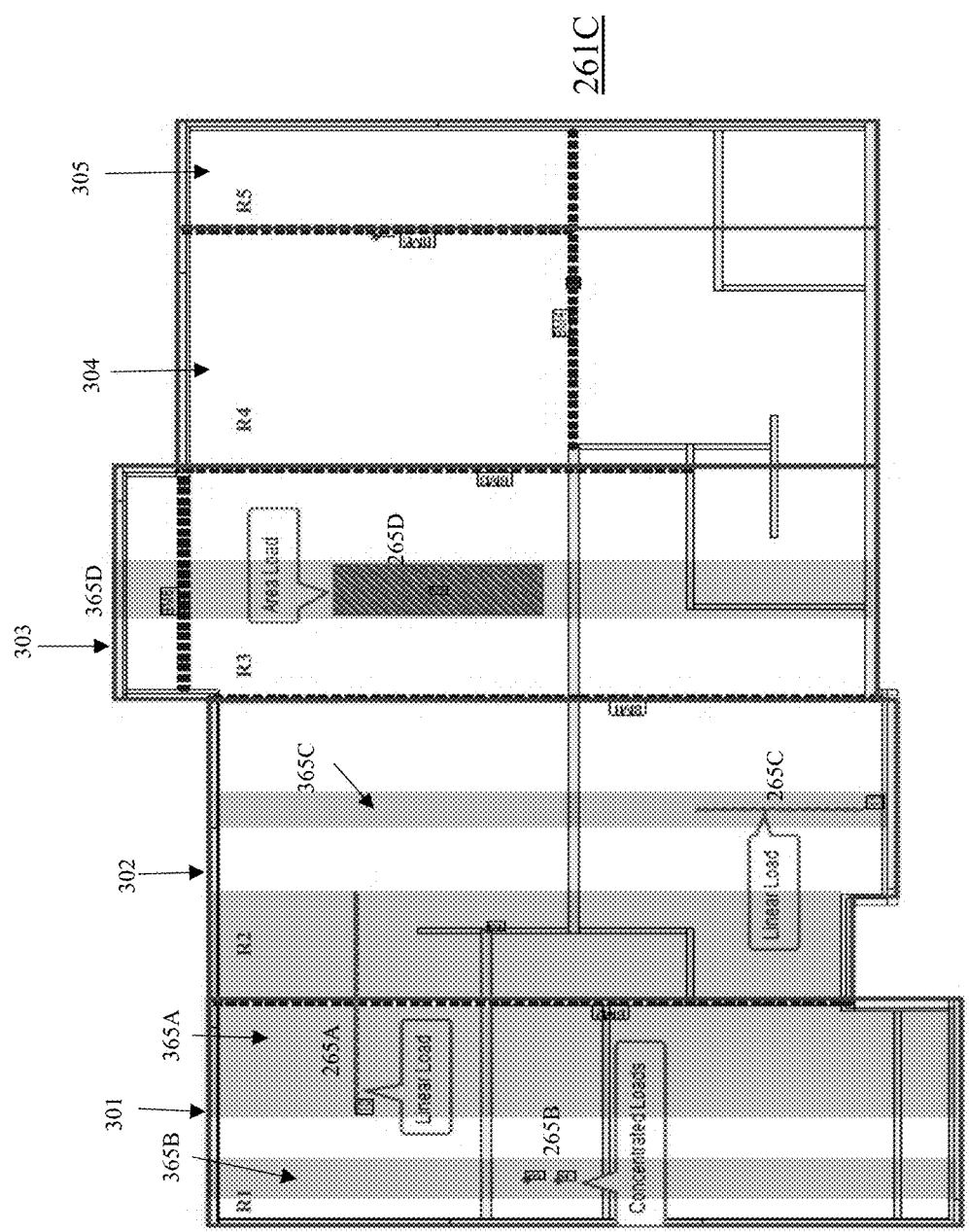
FIG. 3C shows one specific illustrative example of the volume plan layout of FIG. 3B with added vertical load zones as would be represented by one specific illustrative example of region/zone data for a floor framing project including a sample region as generated in accordance with one embodiment.

Building on the previous FIGS. 2B and 2C, the areas outlined in red are identified regions R1 region 301, R2 region 302, R3 region 303, R4 region 304, and R5 region 305. In various embodiments, each of R1 region 301, R2 region 302, R3 region 303, R4 region 304, and R5 region 305 can be of any shape or size. In FIGS. 3A, 3B, 3C as well as 4A through 4E and 6A and 6B, the regions identified and defined are vertically oriented. As discussed below, horizontal or even angled/hybrid regions could be identified and defined in other examples. Each of R1 region 301, R2 region 302, R3 region 303, R4 region 304, and R5 region 305 has physical boundaries in the floor volume of volume plan layout 261. For instance, R1 region 301 has boundaries of walls, 264, on three sides and a beam 266 flush within the volume on the right side.

As noted above, as used herein, anchor regions are regions that are determined to include the most structural constraints and limitations based on a combination of factors including spans, load(s) and/or physical boundaries (walls, beams, openings, plumbing or other obstructions and the like). Likewise, anchor zones are zones within an anchor region that include the structural constraints and limitations.

FIG. 3B shows one specific illustrative example 261B of the floor plan of volume plan layout 261A of FIG. 3A with anchor regions and/or divisions R1 region 301, R2 region 302, R3 region 303, as would be represented by one specific illustrative example of region/zone data 215 for a floor framing project.

In this specific illustrative example, R1 region 301, R2 region 302, and R3 region 303, are considered anchor regions due to the presence of structural constraints resulting from the loads applied to those regions whereas R4 region 304 and R5 region 305 have relatively few constraints.

Specifically, linear load 265A and concentrated loads 265B define R1 region 301 as an anchor region. Likewise, linear loads 265A and 265C define R2 region 302 as an anchor region, and area load 265D defines R3 region 303 as an anchor region.

FIG. 3C shows one specific illustrative example 261C of the floor plan of volume plan layout of FIG. 3B with shaded anchor zones 365A, 365B, 365C, and 365D as would be represented by one specific illustrative example of region/zone data 215 for a floor framing project.

Referring to FIGS. 3B and 3C together, within anchor regions R1 region 301, R2 region 302, R3 region 303 there may exist anchor zones 365A, 365B, 365C, and 365D, indicated by the gray shading, immediately surrounding the structural constraints resulting from the loads applied to those regions.

Anchor zone 365A is defined as a linear load zone by linear load 265A and is included in anchor R1 region 301 and R2 region 302. Similarly, anchor zone 365C is defined as a linear load anchor zone by linear load 265C and is also included in anchor R2 region 302. Likewise, anchor zone 365B is defined as a concentrated load zone by concentrated loads 265B and is included in anchor R1 region 301. Similarly, anchor zone 365D is defined as an area load anchor zone by area load 265D and is included in anchor R3 region 303.

Returning to FIG. 2A, in one embodiment, each identified region or zone in the region/zone data 215 is analyzed by one or more algorithms included in region/zone solution analysis module 217 to generate region/zone solutions data 219A, 219B, through 219N for that region or zone.

As discussed above, in one embodiment, each identified region or zone in the region/zone data is analyzed to generate solutions data for that region or zone. In one embodiment, the region/zone solutions data for each region or zone represents one or more framing solutions for that region or zone.

In one specific illustrative example, for each region, zone, or subregion identified, region/zone solutions data is generated to find several valid joist placements based on the floor axes and the user's selected joist products as follows:
1. Identify the axes to evaluate and the user's selected joist products;
2. For each axis, step through each series;
3. For each series, step through each on-center spacing;
4. For each on-center spacing, step through each offset starting point;
5. For each offset starting point, step through each ply option; and
6. For each ply option:
  i. Create the region contour with beams, rims and walls;
  ii. Frame the region with joists;
  iii. Distribute the point, linear and area loads; and
  iv. Find the smallest product depth such that all joists are structurally compliant with design codes.

As seen in FIG. 2A, each region has its own solutions data, i.e., 219A, 219B, through 219N. In addition, each of region/zone solutions data, i.e., 219A, 219B, through 219N includes multiple solutions for is respective region or zone represented by: R1S1, R1S2, through R1SN for region/zone solutions data 219A for region 1; R2S1, R2S2, through R2SN for solutions data 219B for region 2; through RNS1, RNS2, through RNSN for solutions data 219N for region N. Typically, the number or regions "N" (as in 219N) can include multiple, even hundreds or thousands, of regions depending on the framing project and the number of solutions "N" (as in RNSN) can include hundreds, thousands, or even millions of solutions.

As also seen in FIG. 2A, the only constraints imposed on the solutions represented by region/zone solutions data 219A, 219B, through 219N at this point are the mandatory constraints of code/required constraints data 201 discussed above.

Figure 4A:
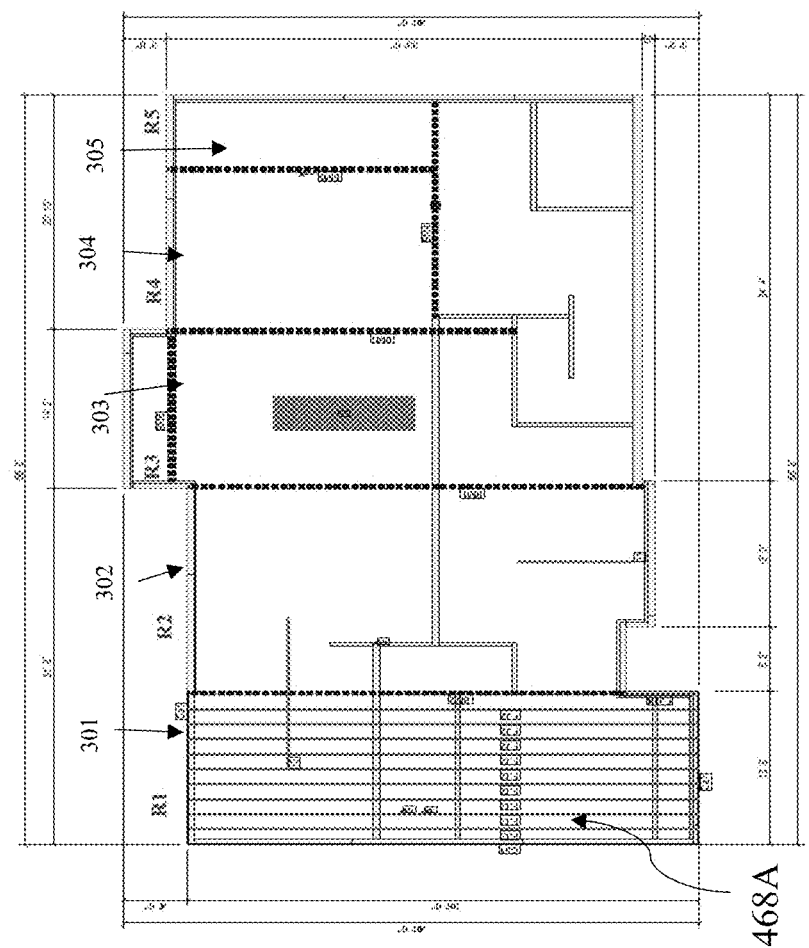
FIG. 4A shows one specific illustrative example of solutions data in the form of one solution for the vertical R1 region shown in FIGS. 3A, 3B, and 3C of the volume plan layout of FIG. 2B as would be represented by one specific illustrative example of solutions data as generated in accordance with one embodiment.

FIG. 4A shows one specific illustrative example 401A of but one solution for R1 region 301 of FIGS. 3A, 3B, and 3C of the volume plan layout of FIGS. 2B, 2C, 3A, 3B, and 3C as would be represented by one specific illustrative example of region/zone solutions data 219A, 219B, through 219N for region/zone data 215 for a floor framing project. As seen in FIG. 4A, the one illustrative solution shown for the single R1 region 301 includes framing members 468A. It is important to note that FIG. 4A illustrates but one solution for the one illustrative R1 region 301. However, as noted above, in actual operation, there could be hundreds or thousands of solutions for R1 region 301.

Building on FIGS. 3A, 3B, and 3C, as seen in FIG. 4A, R1 region 301 is now populated with framing members 468A that are structurally viable based on the loads and geometry representing one of numerous possible solutions for this region.

Figure 4B:
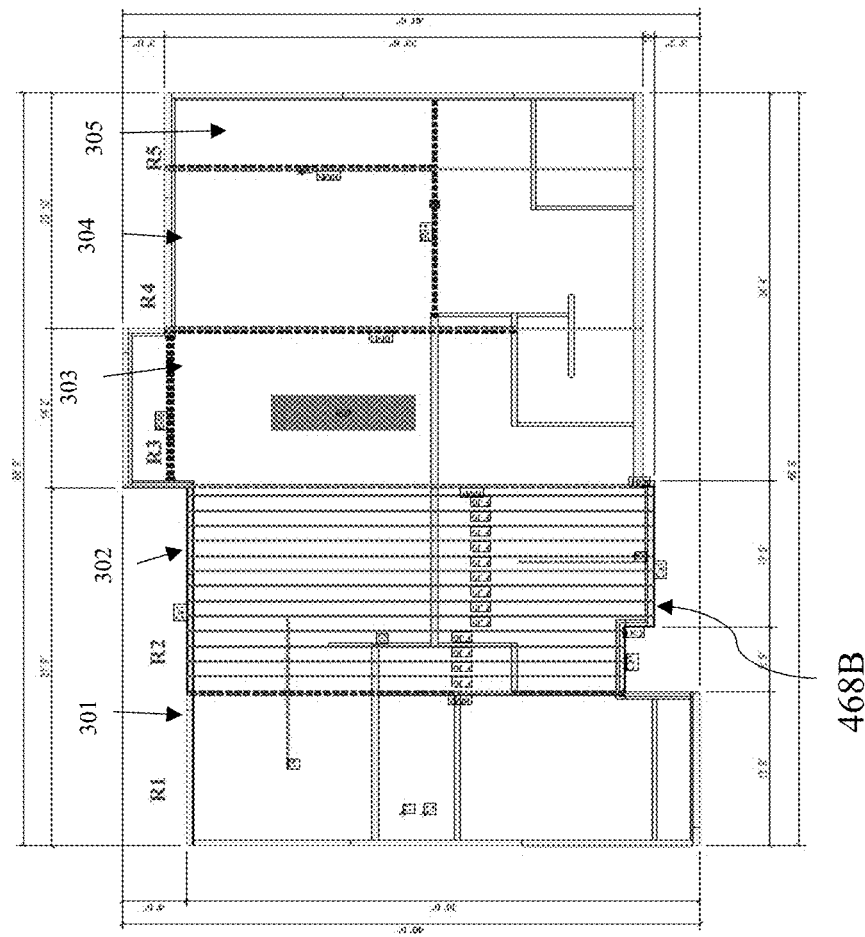
FIG. 4B shows one specific illustrative example of solutions data in the form of one solution for the vertical R2 region shown in FIGS. 3A, 3B, and 3C of the volume plan layout of FIG. 2B as would be represented by one specific illustrative example of solutions data as generated in accordance with one embodiment.

FIG. 4B shows one specific illustrative example 401B of but one solution for R2 region 302 of FIGS. 3A, 3B, and 3C of the volume plan layout of FIGS. 2B, 2C, 3A, 3B, and 3C as would be represented by one specific illustrative example of region/zone solutions data 219A, 219B, through 219N for region/zone data 215 for a floor framing project. As seen in FIG. 4B, the one illustrative solution shown for the single R2 region 302 includes framing members 468B. It is important to note that FIG. 4B illustrates but one solution for the one illustrative R2 region 302. However, as noted above, in actual operation, there could be hundreds or thousands of solutions for R2 region 302.

Building on FIGS. 3A, 3B, and 3C, as seen in FIG. 4B, R2 region 302 is now populated with framing members 468B that are structurally viable based on the loads and geometry representing one of numerous possible solutions for this region.

Figure 4C:
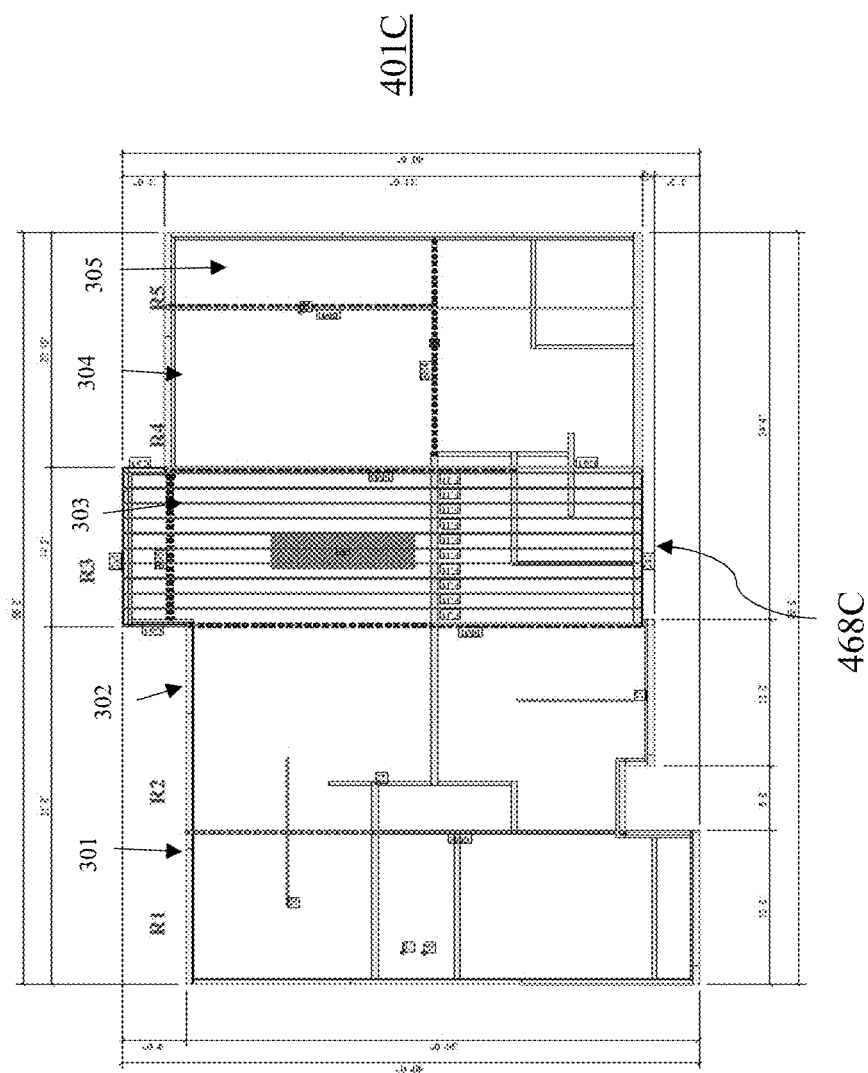
FIG. 4C shows one specific illustrative example of solutions data in the form of one solution for the vertical R3 region shown in FIGS. 3A, 3B, and 3C of the volume plan layout of FIG. 2B as would be represented by one specific illustrative example of solutions data as generated in accordance with one embodiment.

FIG. 4C shows one specific illustrative example 401C of but one solution for R3 region 303 of FIGS. 3A, 3B, and 3C of the volume plan layout of FIGS. 2B, 2C, 3A, 3B, and 3C as would be represented by one specific illustrative example of region/zone solutions data 219A, 219B, through 219N for region/zone data 215 for a floor framing project. As seen in FIG. 4C, the one illustrative solution shown for the single R3 region 303 includes framing members 468C. It is important to note that FIG. 4C illustrates but one solution for the one illustrative R3 region 303. However, as noted above, in actual operation, there could be hundreds or thousands of solutions for R3 region 303.

Building on FIGS. 3A, 3B, and 3C, as seen in FIG. 4C, R3 region 303 is now populated with framing members 468C that are structurally viable based on the loads and geometry representing one of numerous possible solutions for this region.

Figure 4D:
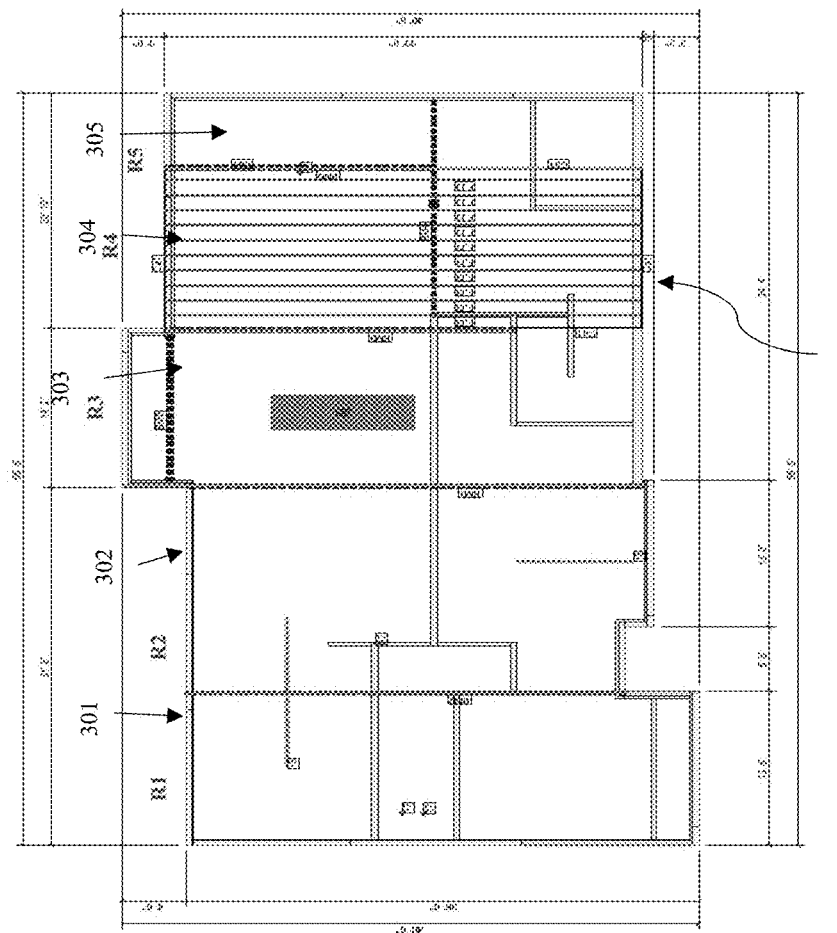
FIG. 4D shows one specific illustrative example of solutions data in the form of one solution for the vertical R4 region shown in FIGS. 3A, 3B, and 3C of the volume plan layout of FIG. 2B as would be represented by one specific illustrative example of solutions data as generated in accordance with one embodiment.

FIG. 4D shows one specific illustrative example 401D of but one solution for R4 region 304 of FIGS. 3A, 3B, and 3C of the volume plan layout of FIGS. 2B, 2C, 3A, 3B, and 3C as would be represented by one specific illustrative example of region/zone solutions data 219A, 219B, through 219N for region/zone data 215 for a floor framing project. As seen in FIG. 4D, the one illustrative solution shown for the single R4 region 304 includes framing members 468D. It is important to note that FIG. 4D illustrates but one solution for the one illustrative R4 region 304. However, as noted above, in actual operation, there could be hundreds or thousands of solutions for R4 region 304.

Building on FIGS. 3A, 3B, and 3C, as seen in FIG. 4D, R4 region 304 is now populated with framing members 468D that are structurally viable based on the loads and geometry representing one of numerous possible solutions for this region.

Figure 4E:
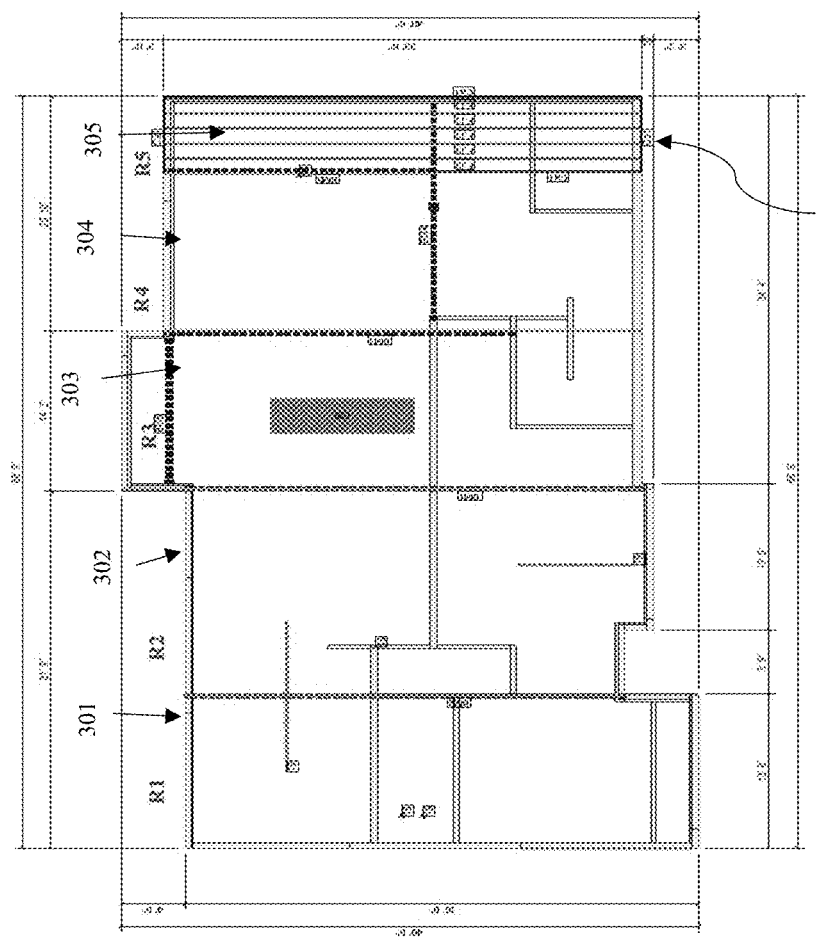
FIG. 4E shows one specific illustrative example of solutions data in the form of one solution for the vertical R5 region shown in FIGS. 3A, 3B, and 3C of the volume plan layout of FIG. 2B as would be represented by one specific illustrative example of solutions data as generated in accordance with one embodiment.

FIG. 4E shows one specific illustrative example 401E of but one solution for R5 region 305 of FIGS. 3A, 3B, and 3C of the volume plan layout of FIGS. 2B, 2C, 3A, 3B, and 3C as would be represented by one specific illustrative example of region/zone solutions data 219A, 219B, through 219N for region/zone data 215 for a floor framing project. As seen in FIG. 4E, the one illustrative solution shown for the single R5 region 305 includes framing members 468E. It is important to note that FIG. 4E illustrates but one solution for the one illustrative R5 region 305. However, as noted above, in actual operation, there could be hundreds or thousands of solutions for R5 region 305.

Building on FIGS. 3A, 3B, and 3C, as seen in FIG. 4E, R5 region 305 is now populated with framing members 468E that are structurally viable based on the loads and geometry representing one of numerous possible solutions for this region.

As noted, FIGS. 4A through 4E illustrate but one solution for each of the respective regions R1 region 301, R2 region 302, R3 region 303, R4 region 304, and R5 region 305. However, as noted above, in actual operation, there could be hundreds or thousands of solutions for each of the regions R1 region 301, R2 region 302, R3 region 303, R4 region 304, and R5 region 305. As a very simplified and specific illustrative example, FIG. 5 shows but only a few framing solutions for R1 Region 301 of FIG. 4A.

Figure 5:
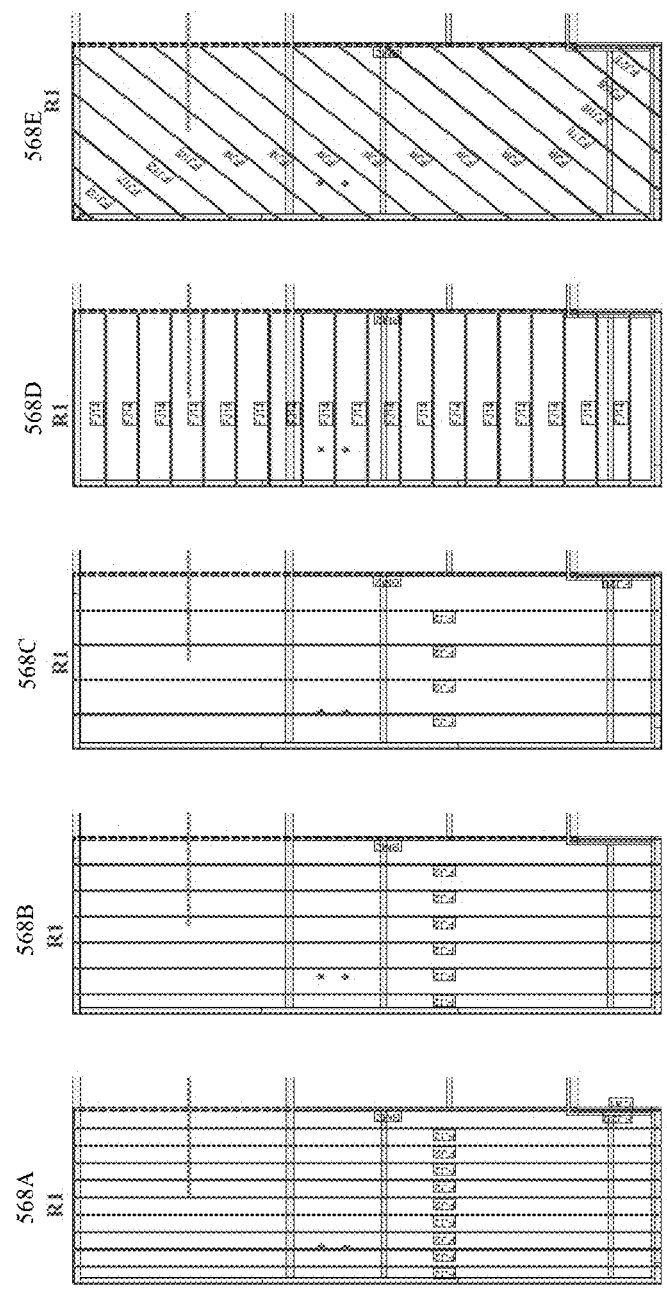
FIG. 5 show illustrative examples of solutions data in the form of several additional solutions for the vertical R1 region shown in FIGS. 3A, 3B, and 3C of the volume plan layout of FIG. 2B as would be represented by one specific illustrative example of solutions data as generated in accordance with one embodiment.

Building on FIG. 4A, FIG. 5 shows five framing solutions 568A, 568B, 568C, 568D, and 568E for R1 Region 301 of FIG. 4A. Again, in practice there can be hundreds or thousands of solutions for R1 Region 301 and hundreds or thousands of solutions for each of regions R2 region 302, R3 region 303, R4 region 304, and R5 region 305 of FIGS. 4B, 4C, 4D, and 4E as well and there could be hundreds of regions per floor plan and volume plan layout.

Returning to FIG. 2A, in one embodiment, once region/zone solutions data 219A, 219B, through 219N is generated for each region or zone, the region/zone solutions data 219A, 219B, through 219N for each region or zone is processed by one or more algorithms included in regions harmonization analysis module 221 to harmonize each solution 219A, 219B, through 219N for each region or zone with the each of the solutions 219A, 219B, through 219N for all other regions or zones. As a result of this processing, intermediate framing plan solutions data 223 is generated representing one or more intermediate framing plan solutions for the project.

In one specific illustrative example, the harmonization process includes:

For each region/zone, retrieve a defined number of top, e.g., 1000000, matches of its subregions or zones' results merge. Top matches are established base on:
  a. Rejection of unsound framing solutions:
    i. Large number of different products;
    ii. Large difference in product depth;
    iii. Large number of variations of framing axis; and
    iv. Large number of different OCS.
  b. Score obtained on matching properties:
    i. Product series;
    ii. Product depth;
    iii. Product plies;
    iv. On center spacing;
    v. Starting offset; and
    vi. Parallelism.
  c. Add a region's own uniform results to the list; and
  d. Proceed recursively until all floor results have been harmonized.

Figure 6A:
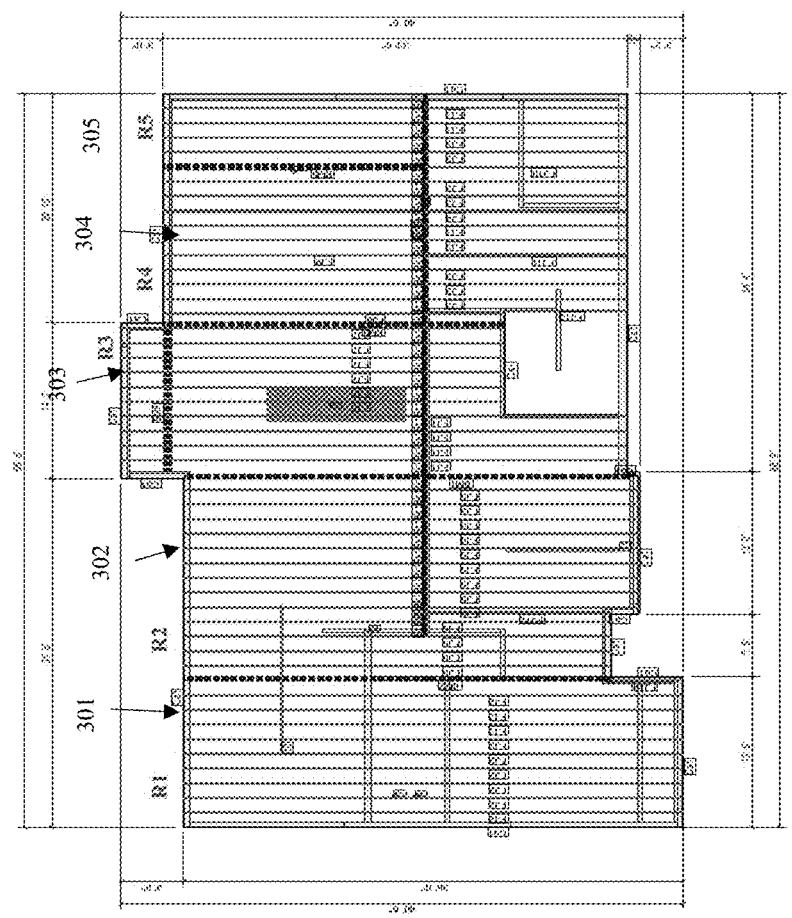
FIG. 6A shows one specific illustrative example of intermediate framing plan solutions data in the form of one possible vertical region-based framing plan intermediate solution for the entire floor of the volume plan layout of FIG. 2B as generated in accordance with one embodiment.

FIG. 6A shows one specific illustrative example of intermediate solutions data 223 in the form of one possible vertical region-based intermediate framing plan solution 600A for the entire floor of the volume plan layout of FIG. 2B as generated in accordance with one embodiment.

As seen in FIG. 6A, vertical region-based intermediate framing plan solution 600A includes individual region solutions data for each of regions R1 region 301, R2 region 302, R3 region 303, R4 region 304, and R5 region 305 of FIGS. 4A 4B, 4C, 4D, and 4E as harmonized into a single intermediate framing plan solution 600A.

FIG. 6B shows several additional specific illustrative examples of solutions data 223 in the form of possible vertical region-based framing plan solutions 600B, 600C, 600D, and 600E for the entire floor of the volume plan layout of FIG. 2B as generated in accordance with one embodiment.

Of note, while five different intermediate framing plan solutions 600A, 600B, 600C, 600D, and 600E are shown in FIGS. 6A and 6B, in reality, there are millions, and even billions, of intermediate framing plan solutions possible for a given volume plan layout of FIG. 2B.

Returning to FIG. 2A, in accordance with the disclosed embodiments, the intermediate framing plan solutions data 223 includes data representing all possible framing plan solutions without regard to cost or other user selected and weighted parameters and constraints. As noted above, in one embodiment, the only constraints/filters applied to the one or more intermediate framing plan solutions for the project represented by intermediate framing plan solutions data 223 are actual physical requirements and code requirements of code/required constraints data 201. Consequently, the number of intermediate framing plan solutions represented in the intermediate framing plan solutions data 223 at this stage of the process will often include millions, or even billions, of possible intermediate framing plan solutions for the project.

As one example, the number of possible intermediate framing plan solutions for a given volume plan layout is determined by the relationship:

$$S_f = \prod_{i=1}^{n_{regions}} Rs_i$$

Where:

$S_f$ = number of intermediate framing plan solutions
$n_{regions}$ = number of regions
$Rs_i$ = number of solutions for region $i$ In the above relationship, the number of solutions per region is the product of the number of variables considered for the region, which might include the number of products considered, on-center spacings, initial starting offsets, and framing directions. This value can be in the hundreds to thousands depending on the variables considered. In one specific illustrative example, 2 framing directions, 5 on-center spacings, 6 initial starting offsets and 4 products generates a possible 240 solutions per region.

Again, referring to the above relationship, the number of possible intermediate framing plan solutions for a given volume plan layout is the product of the solutions per region. In one specific illustrative example, 240 solutions per region in the volume framing plan of FIG. 3A with 5 regions generates a possible $240^5$ or approximately 796 billion intermediate framing plan solutions for the vertically oriented regions. Continuing with the one specific illustrative example, the 4 horizontal regions of FIG. 7 add an additional $240^4$ or approximately 3.3 billion possible intermediate framing plan solutions.

Consequently, as discussed above, the processes disclosed herein are not capable of being performed by any human being, or any number of human beings, regardless of the time provided.

Returning to FIG. 2A, in one embodiment, once the intermediate framing plan solutions data 223 is generated, each of the intermediate framing plan solutions represented in the intermediate framing plan solutions data 223 is analyzed by one or more algorithms included in beam analysis module 225 to identify beams, beam types, and beam parameters required by each intermediate framing plan solution represented in the intermediate framing plan solutions data 223. Once beam analysis is performed for each of the intermediate framing plan solutions, the resulting set of intermediate and beam analyzed framing plan solutions are stored as possible framing plan solutions data 227.

In one specific illustrative example, beam analysis is performed as follows:
1. Identify each beam to size;
2. Collect all loads supported by beam; and
3. Step through beam series, width, depth from smallest to largest via a structural compliance engine until a structurally adequate solution is reached.

As seen in FIG. 2A, in one embodiment, possible framing plan solutions data 227 includes individual plan solution data, i.e., plan solution 1 data, plan solution 2 data, through plan solution N data, representing "N" individual plan solutions and all the possible framing plan solutions. It is again worth noting that, in one embodiment, the only constraints/filters applied to the possible framing plan solutions represented in the possible framing plan solutions data for the project are actual physical requirements, code requirements of code/required constraints data 201 and beam analysis module 225. Consequently, possible framing plan solutions represented in the possible framing plan solutions data 227, i.e., the number "N" as in plan N solutions data, for the project at this stage will still often include millions of possible framing plan solutions, or even billions.

In the discussion above with respect to FIGS. 3A through 6B, the analysis was performed based on identified vertically orientated regions. However, in other embodiments, horizontally oriented regions can be identified and processed.

FIG. 7 shows one specific illustrative example 761A of the volume plan layout of FIG. 2B with added horizontal regions R6 region 706, R7 region 707, R8 region 708, and R9 region 709, as would be represented by one specific illustrative example of region/zone data 215 for a floor framing project in accordance with one embodiment.

Building on the previous FIGS. 2B and 2C, the areas outlined in red are R6 region 706, R7 region 707, R8 region 708, and R9 region 709. In various embodiments, each of R6 region 706, R7 region 707, R8 region 708, and R9 region 709 can be of any shape or size. Each of R6 region 706, R7 region 707, R8 region 708, and R9 region 709 has physical boundaries in the floor volume of volume plan layout 261/761A.

As noted above, as used herein, anchor regions are regions that are determined to include the most structural constraints and limitations based on a combination of factors including spans, load(s) and/or physical boundaries (walls, beams, openings, plumbing or other obstructions and the like). Likewise, anchor zones are zones within an anchor region that include the structural constraints and limitations.

FIG. 8A shows one specific illustrative example 800A of but one solution for R6 region 706 of FIG. 7 of the volume plan layout of FIGS. 2B, 2C, and 7 as would be represented by one specific illustrative example of region/zone solutions data 219A, 219B, through 219N for region/zone data 215 for a floor framing project. As seen in FIG. 8A, the one illustrative solution shown for the single R6 region 706 includes framing members 868A. It is important to note that FIG. 8A illustrates but one solution for the one illustrative R6 region 706. However, as noted above, in actual operation, there could be hundreds or thousands of solutions for R6 region 706.

Building on FIG. 7 as seen in FIG. 8A, R6 region 706 is now populated with framing members 868A that are structurally viable based on the loads and geometry representing one of numerous possible solutions for this region.

FIG. 8B shows one specific illustrative example 800B of but one solution for R7 region 707 of FIG. 7 of the volume plan layout of FIGS. 2B, 2C, and 7 as would be represented by one specific illustrative example of region/zone solutions data 219A, 219B, through 219N for region/zone data 215 for a floor framing project. As seen in FIG. 8B, the one illustrative solution shown for the single R7 region 707 includes framing members 868B. It is important to note that FIG. 8B illustrates but one solution for the one illustrative R7 region 707. However, as noted above, in actual operation, there could be hundreds or thousands of solutions for R7 region 707.

Building on FIG. 7 as seen in FIG. 8B, R7 region 707 is now populated with framing members 868B that are structurally viable based on the loads and geometry representing one of numerous possible solutions for this region.

FIG. 8C shows one specific illustrative example 800C of but one solution for R8 region 708 of FIG. 7 of the volume plan layout of FIGS. 2B, 2C, and 7 as would be represented by one specific illustrative example of region/zone solutions data 219A, 219B, through 219N for region/zone data 215 for a floor framing project. As seen in FIG. 8C, the one illustrative solution shown for the single R8 region 708 includes framing members 868C. It is important to note that FIG. 8C illustrates but one solution for the one illustrative R8 region 708. However, as noted above, in actual operation, there could be hundreds or thousands of solutions for R8 region 708.

Building on FIG. 7 as seen in FIG. 8C, R8 region 708 is now populated with framing members 868C that are structurally viable based on the loads and geometry representing one of numerous possible solutions for this region.

FIG. 8D shows one specific illustrative example 800D of but one solution for R9 region 709 of FIG. 7 of the volume plan layout of FIGS. 2B, 2C, and 7 as would be represented by one specific illustrative example of region/zone solutions data 219A, 219B, through 219N for region/zone data 215 for a floor framing project. As seen in FIG. 8D, the one illustrative solution shown for the single R9 region 709 includes framing members 868D. It is important to note that FIG. 8D illustrates but one solution for the one illustrative R9 region 709. However, as noted above, in actual operation, there could be hundreds or thousands of solutions for R9 region 709.

Building on FIG. 7 as seen in FIG. 8D, R9 region 709 is now populated with framing members 868D that are structurally viable based on the loads and geometry representing one of numerous possible solutions for this region.

As noted, FIGS. 8A through 8D illustrate but one region/zone solution for each of the respective regions R6 region 706, R7 region 707, R8 region 708, and R9 region 709. However, as noted above, in actual operation, there could be hundreds or thousands of region/zone solutions for each of the regions R6 region 706, R7 region 707, R8 region 708, and R9 region 709. As a very simplified and specific illustrative example, FIG. 9 shows but only a few framing solutions for R6 region 706 of FIG. 8A.

FIG. 9 shows illustrative example of region/zone solutions data in the form of several additional solutions 968A, 968B, 968C and 968D for the horizontal R6 region shown in FIG. 7 of the volume plan layout of FIG. 2B as would be represented by one specific illustrative example of solutions data as generated in accordance with one embodiment.

Building on FIG. 8A, FIGS. 8A and 9 show five region/zone solutions 868A, 968A, 968B, 968C, and 968D for R6 Region 706 of FIG. 8A. Again, in practice there can be hundreds or thousands of region/zone solutions for R6 Region 706 and hundreds or thousands of s region/zone solutions for each of regions R7 region 707, R8 region 708, and R9 region 709 of FIGS. 8B, 8C, and 8D as well and there could be hundreds of regions per floor plan and volume plan layout.

Returning to FIG. 2A, as discussed above, in one embodiment, once region/zone solutions data 219A, 219B, through 219N is generated for each region or zone, the region/zone solutions data 219A, 219B, through 219N for each region or zone is processed by one or more algorithms included in regions harmonization analysis module 221 to harmonize each solution 219A, 219B, through 219N for each region or zone with the each of the solutions 219A, 219B, through 219N for all other regions or zones. As a result of this processing, intermediate framing plan solutions data 223 is generated representing one or more intermediate framing plan solutions for the project.

In one specific illustrative example, the harmonization process includes:

For each region/zone, retrieve the defined number of top matches, e.g., 1000000, of its subregions or zones' results merge. Top matches are established base on:
  a. Rejection of unsound framing solutions:
    i. Large number of different products;
    ii. Large difference in product depth;
    iii. Large number of variations of framing axis; and
    iv. Large number of different OCS.
  b. Score obtained on matching properties:
    i. Product series;
    ii. Product depth;
    iii. Product plies;
    iv. On center spacing;
    v. Starting offset; and
    vi. Parallelism.
  c. Add a region's own uniform results to the list; and
  d. Proceed recursively until all floor results have been harmonized.

FIG. 10A shows one specific illustrative example of intermediate solutions data 223 in the form of one possible horizontal region-based intermediate framing plan solution 1000A for the entire floor of the volume plan layout of FIG. 2B as generated in accordance with one embodiment.

As seen in FIG. 10A, horizontal region-based intermediate framing plan solution 1000A includes individual region/zone solutions data for each of regions R6 region 706, R7 region 707, R8 region 708, and R9 region 709 of FIGS. 8A 8B, 8C, and 8D as harmonized into a single intermediate framing plan solution 1000A.

FIG. 10B shows several additional specific illustrative examples of intermediate framing plan solutions data 223 in the form of possible horizontal region-based intermediate framing plan solutions 1000B, 1000C, 1000D, and 1000E for the entire floor of the volume plan layout of FIG. 2B as generated in accordance with one embodiment.

Of note, while five different intermediate framing plan solutions 1000A, 1000B, 1000C, 1000D and 1000E are shown in FIGS. 10A and 10B, in reality, there are millions and even billions of intermediate framing plan solutions possible for a given volume plan layout of FIG. 2B.

Consequently, as discussed above, the processes disclosed herein are not capable of being performed by any human being, or any number of human beings, regardless of the time provided.

In one embodiment, either before, concurrently, or after the possible framing plan solutions data 227 is generated, available constraints are identified, in one embodiment, by the designer 240. In various embodiments, the available constraints can include, but are not limited to: the amount or volume of wood that is required for a particular framing plan the number and type of joists, such as an I-joist, required for a particular framing plan; the On Center Spacing (OCS) for the various parts of a particular framing plan which will vary according to code requirements and the various load anticipated for various parts of the framing plan; starting offset for the particular framing plan; the number of hangers/connectors/welds that are required for a particular framing plan; the number of skewed cuts that are required for particular framing plan; the deck layout of a particular framing plan; the availability of components needed for particular framing plan; wood volume cost; consistent OCS; number of OCS changes; referred OCS; number of changes in framing direction; number of different hanger models; number of different product series; number of different product depths; sheathing layout; number of beams; number of different beam grades; number of different beam widths; number of different beam depths; availability in on-hand inventory; geographic availability; shipping distance; deflection ratio; maximum deflection; vibration performance; sound transmission performance; fire assembly performance; suitability for finish materials; capacity utilization ratio; span to depth ratio; types of fasteners required; number of fasteners required; number of sheathing cuts; volume of accessory material required; number of web stiffeners required; constructability; labor required; equipment required; assembly time; material delivery efficiency; individual component weight; required sheathing thickness; desired sheathing thickness; sheathing deflection between joists; and/or numerous other standard and/or customized requirements associated with any framing plan.

Available constraints data 241 is then generated representing the available constraints. In one embodiment, desired and/or applicable available constraints are then selected, in one embodiment, by the designer and/or customer 242 at constraints selection module 243 to generate selected constraints data 245. In one embodiment, the selected constraints represented in the selected constraints data 245 are then weighted by the designer/customer/user 244 at constraints weighting module 247 and weighted selected constraints data 249 is generated representing the weighted selected constraints.

In addition, in one embodiment, the selected constraints represented in the selected constraints data are also compared with product cost and availability information represented by product cost/availability data 203.

FIG. 11A shows one simplified illustrative example of possible framing plan solutions data 227 in the form of the set 1100 of ten possible framing plan solutions resulting after beam analysis of the intermediate framing plan solutions of FIGS. 6A, 6B, 10A, and 10B.

As noted, while ten different possible framing plan solutions 600A, 600B, 600C, 600D, 600E, 1000A, 1000B, 1000C, 1000D, and 1000E are shown in FIG. 11A, in reality, there are often millions, and even billions, of possible framing plan solutions for a given volume plan layout of FIG. 2B.

FIG. 11B shows one example of a constraints selection and weighting user interface 1150 that could be provided by a constraints weighting module 247 to generate weighted selected constraints data 249 in accordance with one embodiment. As can be seen in FIG. 11B, constraints selection and weighting user interface 1150 includes a listing of possible constraints 1153 that can be, or have been, selected, and weighting values 1155 associated with each constraint listed in possible constraints 1153.

Returning to FIG. 2A, in one embodiment, once the weighted selected constraints data 249 and possible framing plan solutions data 227 is generated, the possible framing plan solutions data 227 is processed by one or more algorithms included in constraints analysis module 231 using the weighted selected constraints data 249 to generate constraints filtered framing plan solutions data 253.

In accordance with the disclosed embodiments, the constraints filtered framing plan solutions data 253 represents individual filtered framing plan solutions data, i.e., filtered solution 1 data, filtered solution 2 data, through filtered solution 5 data, that meet, or most closely match, the weighted selected constraints data 249.

It is worth noting that, in accordance with the disclosed embodiments, the constraints filtered framing plan solutions data 253 represents framing solutions that are, for the first time, filtered according to the designer/customer selected constraints/parameters as weighted for importance by the designer/customer of weighted selected constraints data 249. Therefore, the set of filtered framing plan solutions represented in constraints filtered framing plan solutions data 253 is likely a smaller sub-set of the possible framing plan solutions represented in the possible framing plan solutions data 227. However, in many cases the number of filtered framing plan solutions represented in filtered framing plan solutions data 251 may still be in the hundreds, thousands, or even millions. However, for simplicity of illustration only 5 filtered solutions represented by filtered solution 1 data, filtered solution 2 data, filtered solution 3 data, filtered solution 4 data, and filtered solution 5 data are shown in FIG. 2A.

FIG. 12 shows constraints filtered framing plan solution data 253 in the form of a set 1200 of six constraints filtered framing plan solutions 600B, 600D, 1000B, 1000C, 1000D, and 1000E, filtered from the set 1100 of ten possible framing plan solutions of FIG. 11A using the weighted constraints data of FIG. 11B.

Returning to FIG. 2A, in one embodiment, once the constraints filtered framing plan solutions data 253 is generated, each filtered framing plan solution represented in the constraints filtered framing plan solutions data 253 is analyzed using one or more algorithms and using the weighted selected constraints data 249 at ranking/filtering module 255. As a result of this processing at ranking filtering module 255 each filtered framing plan solution in the constraints filtered framing plan solutions data 253 is ranked according to how closely the filtered framing plan solution matches the weighted selected constraints indicated in the weighted selected constraints data 249.

In one embodiment, a defined number "N" of top ranked filtered framing plan solutions is then determined and selected top "N" solutions data 257 is generated. As seen in FIG. 2A, selected top "N" solutions data 257 includes individual ranked plan solutions data representing includes individual ranked plan solutions. In the specific illustrative example of FIG. 2A, "N" is selected to be 3 so, in this specific illustrative example, selected top "N" solutions data 257 includes #1 ranked plan solution data, #2 ranked plan solution data, and #3 ranked plan solution data, which is a sub set of the 5 filtered solutions represented by filtered solution 1 data, filtered solution 2 data, filtered solution 3 data, filtered solution 4 data, and filtered solution 5 data shown in constraints filtered framing plan solutions data 253.

FIG. 13A shows selected top "N" solution data 257 in the form of the selected top three solutions option 1 (600B), option 2 (600D), and option 3 (1000B) filtered from the set 1200 of six constraints filtered framing plan solutions 600B, 600D, 1000B, 1000C, 1000D, and 1000E, after processing by ranking filtering module 255 (FIG. 2A).

Returning to FIG. 2A, in one embodiment, selected top "N" solutions data 257 includes various summary data. In one embodiment, once selected top "N" solutions data 257 is generated, the selected top "N" solutions data 257, including any summary data, is provided to the user, i.e., designer or customer. In various embodiments, the selected top "N" solutions data 257, including any summary data, is provided to the user either directly or through a parent, or external, CAD system at 259.

FIG. 13B shows an illustrative example of summary data 1350 listing the top three selected framing solutions of FIG. 13A, i.e., option 1, option 2, and option 3, in accordance with one embodiment.

In various embodiments, summary data 1350 listing the top three selected framing solutions of FIG. 13B, i.e., option 1, option 2, and option 3, and/or the top three selected framing solutions of FIG. 13A would then be provided to the user, i.e., the designer and/or customer via a parent system at to CAD and/or customer 259.

Those of skill in the art will readily recognize that the specific illustrative examples of one embodiment of the FIGs. discussed above are but specific examples of numerous possibilities, arrangement of components, and images. Consequently, the specific illustrative examples of one embodiment shown in the included FIGs. are not intended to limit the scope of the invention as set forth in the claims below.

As shown above, the disclosed embodiments of the present disclosure provide to the long-standing technical problem of effectively and efficiently generating a set of framing plans for a building construction project that not only take into account all of the variables associated with the construction project but that also are determined to best meet the customized needs and desires of the designer and/or customer associated with the construction project. In addition, the disclosed technical solution provides a set of framing plans for a building construction project that are ranked according to input from the designer and/or customer regarding the relative importance of each of the parameters and variables of the building construction project. Consequently, the disclosed embodiments provide the flexibility and holistic approach to determining a "best" framing plan for a given construction project that cannot be provided using strictly human resources or currently available CAD design systems.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

In addition, the operations shown in the figures, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented method for generating construction framing solutions comprising:
    providing a user with an enhanced framing layout system;
    obtaining, by one or more processors of the enhanced framing layout system, input plan data representing initial floor or wall geometry and engineering information associated with a construction project;
    analyzing, by a region/zone analysis module of the enhanced framing layout system, the input plan data to identify regions or zones;
    generating, by the region/zone analysis module of the enhanced framing layout system, region/zone data representing the input plan data with the regions/zones included;
    for each identified region or zone in the region/zone data, processing, by a region/zone solution analysis module of the enhanced framing layout system, the region/zone data for that region or zone to generate regional framing solutions data for that region or zone representing one or more potential framing solutions for that region or zone;
    processing, by a regions harmonization analysis module of the enhanced framing layout system, the regional framing solutions data for each region or zone to harmonize each solution for each region or zone with each of the solutions for all other regions or zones, wherein harmonizing each solution includes determining top matches of a zone results merge for each region, further wherein the top matches are determined by rejection of unsound framing solutions, and further wherein rejection of unsound framing solutions includes:
        rejection of framing solutions that include more than a threshold number of different products;
        rejection of framing solutions that include more than a threshold number of variations of framing axis; and
        rejection of framing solutions that include more than a threshold number of On Center Spacings (OCS);
    generating, by the regions harmonization analysis module of the enhanced framing layout system, possible framing plan solutions data for the project representing a set of possible framing plan solutions for the project;
    generating, by one or more processors of the enhanced framing layout system, available constraints data representing selectable available constraints for the construction project;
    selecting, through a user interface of the enhanced framing layout system, desired constraints from the available constraints data and generating selected constraints data;
    for each of the selected constraints represented in the selected constraints data, selecting, through the user interface of the enhanced framing layout system, a weighting value to be applied to the selected constraint/parameter and generating weighted selected constraints data representing the weighted selected constraints;
    processing, by a constraints analysis module of the enhanced framing layout system, the possible framing plan solutions data, using the weighted selected constraints data, to generate constraints filtered framing plan solutions data representing filtered framing plan solutions that meet, or most closely match, the weighted selected constraints represented in the weighted selected constraints data;
    for each filtered framing plan represented in the filtered framing plan solutions data, ranking, by a ranking/filtering module of the enhanced framing layout system, using the weighted selected constraints data, each filtered framing plan represented in the filtered framing plan solutions data according to how closely that filtered framing plan solution matches the weighted selected constraints indicated in the weighted selected constraints data;
    selecting, by the ranking/filtering module of the enhanced framing layout system, one or more top ranked filtered framing plan solutions;
    generating, by one or more processors of the enhanced framing layout system, one or more digital plan solution diagrams for each of the one or more top ranked filtered framing plan solutions;
    generating, by one or more processors of the enhanced framing layout system, top ranked filtered framing plan solutions data representing a defined number of the top ranked filtered framing plan solutions to a user, wherein the top ranked filtered framing plan solutions data includes the one or more digital plan solution diagrams and framing plan summary data; and
    outputting the top ranked filtered framing plan solutions data through a display of a framing plan system.

2. The computing system implemented method for generating construction framing solutions of claim 1 wherein the input plan data representing initial floor or wall geometry and engineering information associated with a construction project is obtained from a Computer Aided Design system that is a parent system for the computing system implemented method for generating construction framing solutions.

3. The computing system implemented method for generating construction framing solutions of claim 1 wherein the regions are identified based on a given region having a uniform loading and the zones are sub-portions of a region in which the zone resides and the zones are identified based on a load being present in the zone.

4. The computing system implemented method for generating construction framing solutions of claim 1 wherein the regions are identified by:
   determining floor volume contour;
   identifying beams flush within the floor volume;
   identifying openings in the floor volume;
   determining loads in the floor volume, and;
   dividing a region into two or more zones limited by beams placed under point and linear loads and/or zones without limiting beams for linear or area loads.

5. The computing system implemented method for generating construction framing solutions of claim 1 wherein regional framing solutions data for each region or zone is generated by:
   identifying the axes to evaluate and the user selected joist products;
   for each axis, stepping through each series;
   for each series, stepping through each on-center spacing;
   for each on-center spacing, stepping through each offset starting point;
   for each offset starting point, stepping through each ply option; and
   for each ply option:
      creating the region contour with beams, rims and walls;
      framing the region with joists;
      distributing the point, linear and area loads; and
      finding the smallest product depth such that all joists are structurally compliant with design codes.

6. The computing system implemented method for generating construction framing solutions of claim 1 wherein processing the regional framing solutions data for each region or zone to harmonize each solution for each region or zone with each of the solutions for all other regions or zones and generate possible framing plan solutions data for the project further includes:
   adding the top matches to a region solutions list; and
   proceeding recursively through each region until all regions and zones have been harmonized.

7. The computing system implemented method for generating construction framing solutions of claim 6 wherein the top matches for each region are further determined by:
   determining a score based on matching properties;
   adding uniform results for the region to a top match list; and
   proceeding recursively until all regions/zones results in the framing plan have been harmonized.

8. The computing system implemented method for generating construction framing solutions of claim 7 wherein determining a score based on matching properties includes taking into consideration one or more of:
   product series;
   product depths;
   product plies;
   OCS;
   starting offsets; and
   parallelism.

9. The computing system implemented method for generating construction framing solutions of claim 1 wherein the constraints data for the construction project includes constraints data including one or more of:
   constraints data mandated by physical requirements;
   constraints data mandated by building codes;
   constraints data selected by designer input; and
   constraints data selected by customer input.

10. The computing system implemented method for generating construction framing solutions of claim 1 wherein one or more constraints represented in the constraints data has a weighting value applied to the constraint based on designer input.

11. The computing system implemented method for generating construction framing solutions of claim 1 wherein one or more constraints represented in the constraints data has a weighting value applied to the constraint based on customer input.

12. An enhanced framing layout system for generating construction framing solutions comprising:
   a region/zone analysis module;
   a region/zone solution analysis module;
   a regions harmonization analysis module;
   a constraints analysis module;
   a ranking/filtering module;
   one or more user interfaces;
   at least one processor; and
   at least one memory, the at least one memory including instructions that when executed by the at least one processor perform a process, the process including:
   obtaining, by the at least one processor, input plan data representing initial floor or wall geometry and engineering information associated with a construction project;
   analyzing, by the region/zone analysis module, the input plan data to identify regions or zones;
   generating, by the region/zone analysis module, region/zone data representing the input plan data with the regions/zones included;
   for each identified region or zone in the region/zone data, processing, by the region/zone solution analysis module, the region/zone data for that region or zone to generate regional framing solutions data for that region or zone representing one or more framing solutions for that region or zone;
   processing, by the regions harmonization analysis module, the regional framing solutions data for each region or zone to harmonize each solution for each region or zone with each of the solutions for all other regions or zones, wherein harmonizing each solution includes determining top matches of a zone results merge for each region, further wherein the top matches are determined by rejection of unsound framing solutions, and further wherein rejection of unsound framing solutions includes:
      rejection of framing solutions that include more than a threshold number of different products;
      rejection of framing solutions that include more than a threshold number of variations of framing axis; and
      rejection of framing solutions that include more than a threshold number of On Center Spacings (OCS);
   generating, by the regions harmonization analysis module, possible framing plan solutions data for the project representing a set of possible framing plan solutions for the project;
   generating, by the at least one processor, available constraints data representing selectable available constraints for the construction project;

selecting, through a user interface of the one or more user interfaces, desired constraints from the available constraints data and generating selected constraints data;

for each of the selected constraints represented in the selected constraints data, selecting, through the user interface of the one or more user interfaces, a weighting value to be applied to the selected constraint/parameter and generating weighted selected constraints data representing the weighted selected constraints;

processing, by the constraints analysis module, the possible framing plan solutions data, using the weighted selected constraints data, to generate constraints filtered framing plan solutions data representing filtered framing plan solutions that meet, or most closely match, the weighted selected constraints represented in the weighted selected constraints data;

for each filtered framing plan represented in the filtered framing plan solutions data ranking, by the ranking/filtering module, using the weighted selected constraints data, each filtered framing plan represented in the filtered framing plan solutions data according to how closely that filtered framing plan solution matches the weighted selected constraints indicated in the weighted selected constraints data;

selecting, by the ranking/filtering module, one or more top ranked filtered framing plan solutions;

generating, by the at least one processor, one or more digital plan solution diagrams for each of the one or more top ranked filtered framing plan solutions;

generating, by the at least one processor, top ranked filtered framing plan solutions data representing a defined number of the top ranked filtered framing plan solutions to a user, wherein the top ranked filtered framing plan solutions data includes the one or more digital plan solution diagrams and framing plan summary data; and outputting the top ranked filtered framing plan solutions data through a display of a framing plan system.

13. The system of claim 12 wherein the regions are identified based on a given region having a uniform loading, further wherein the zones are sub-portions of a region in which the zone resides and the zones are identified based on a load being present in the zone.

14. The system for generating construction framing solutions of claim 13 wherein the constraints data for the construction project includes constraints data including one or more of:
constraints data mandated by physical requirements;
constraints data mandated by building codes;
constraints data selected by designer input; and
constraints data selected by customer input.

15. The system for generating construction framing solutions of claim 12 wherein one or more constraints represented in the constraints data has a weighting value applied to the constraint based on designer input.

16. The system for generating construction framing solutions of claim 12 wherein one or more constraints represented in the constraints data has a weighting value applied to the constraint based on customer input.

17. A computing system implemented method for generating construction framing solutions comprising:
providing a user with an enhanced framing layout system;
obtaining, by one or more processors of the enhanced framing layout system, input plan data representing initial floor or wall geometry and engineering information associated with a construction project;

analyzing, by a region/zone analysis module of the enhanced framing layout system, the input plan data to identify regions or zones;

generating, by the region/zone analysis module of the enhanced framing layout system, region/zone data representing the input plan data with the regions/zones included;

for each identified region or zone in the region/zone data, processing, by a region/zone solution analysis module of the enhanced framing layout system, the region/zone data for that region or zone to generate regional framing solutions data for that region or zone representing one or more framing solutions for that region or zone;

processing the regional framing solutions data for each region or zone to harmonize each solution for each region or zone with each of the solutions for all other regions or zones, wherein harmonizing each solution includes:
determining top matches of a zone results merge for each region;
adding the top matches to a region solutions list; and
proceeding recursively through each region until all regions and zones have been harmonized;

further wherein the top matches are determined by:
rejection of unsound framing solutions;
determining a score based on matching properties;
adding uniform results for the region to a top match list; and
proceeding recursively until all regions/zones results in the framing plan have been harmonized;

further wherein rejection of unsound framing solutions includes:
rejection of framing solutions that include more than a threshold number of different products;
rejection of framing solutions that include more than a threshold number of variations of framing axis; and
rejection of framing solutions that include more than a threshold number of On Center Spacings (OCS);

generating, by the regions harmonization analysis module of the enhanced framing layout system, intermediate framing plan solutions data for the project representing a set of intermediate framing plan solutions for the project;

performing, by a beam analysis module of the enhanced framing layout system, beam analysis on the intermediate framing plan solutions data to identify beams, beam types, and beam dimensions required by each intermediate framing plan solution represented in the intermediate framing plan solutions data to generate possible framing plan solutions data;

generating, by one or more processors of the enhanced framing layout system, available constraints data representing selectable available constraints for the construction project;

selecting, through a user interface of the enhanced framing layout system, desired constraints from the available constraints data and generating selected constraints data;

for each of the selected constraints represented in the selected constraints data, selecting, through the user interface of the enhanced framing layout system, a weighting value to be applied to the selected constraint/parameter and generating weighted selected constraints data representing the weighted selected constraints;

processing, by a constraints analysis module of the enhanced framing layout system, the possible framing plan solutions data, using the weighted selected constraints data, to generate constraints filtered framing plan solutions data representing filtered framing plan solutions that meet, or most closely match, the weighted selected constraints represented in the weighted selected constraints data;

for each filtered framing plan represented in the filtered framing plan solutions data ranking, by a ranking/filtering module of the enhanced framing layout system, using the weighted selected constraints data, each filtered framing plan represented in the filtered framing plan solutions data according to how closely that filtered framing plan solution matches the weighted selected constraints indicated in the weighted selected constraints data;

selecting, by the ranking/filtering module of the enhanced framing layout system, one or more top ranked filtered framing plan solutions;

generating, by one or more processors of the enhanced framing layout system, one or more digital plan solution diagrams for each of the one or more top ranked filtered framing plan solutions;

generating, by one or more processors of the enhanced framing layout system, top ranked filtered framing plan solutions data representing a defined number of the top ranked filtered framing plan solutions to a user, wherein the top ranked filtered framing plan solutions data includes the one or more digital plan solution diagrams and framing plan summary data; and outputting the top ranked filtered framing plan solutions data through a display of a framing plan system.

18. The computing system implemented method for generating construction framing solutions of claim 17 wherein performing beam analysis on the intermediate framing plan solutions data includes:
identifying each beam;
for each identified beam collecting all loads supported by the beam; and
for each beams, stepping through possible beam series, beam width, and beam depth from smallest to largest using structural compliance analysis until a structurally adequate solution is reached.

19. The computing system implemented method for generating construction framing solutions of claim 17 wherein the regions are identified based on a given region having a uniform loading, further wherein the zones are sub-portions of a region in which the zone resides and the zones are identified based on a load being present in the zone.

* * * * *